Sept. 19, 1944.   E. J. SVENSON   2,358,361
MATERIAL WORKING APPARATUS
Filed Aug. 2, 1940   10 Sheets-Sheet 1
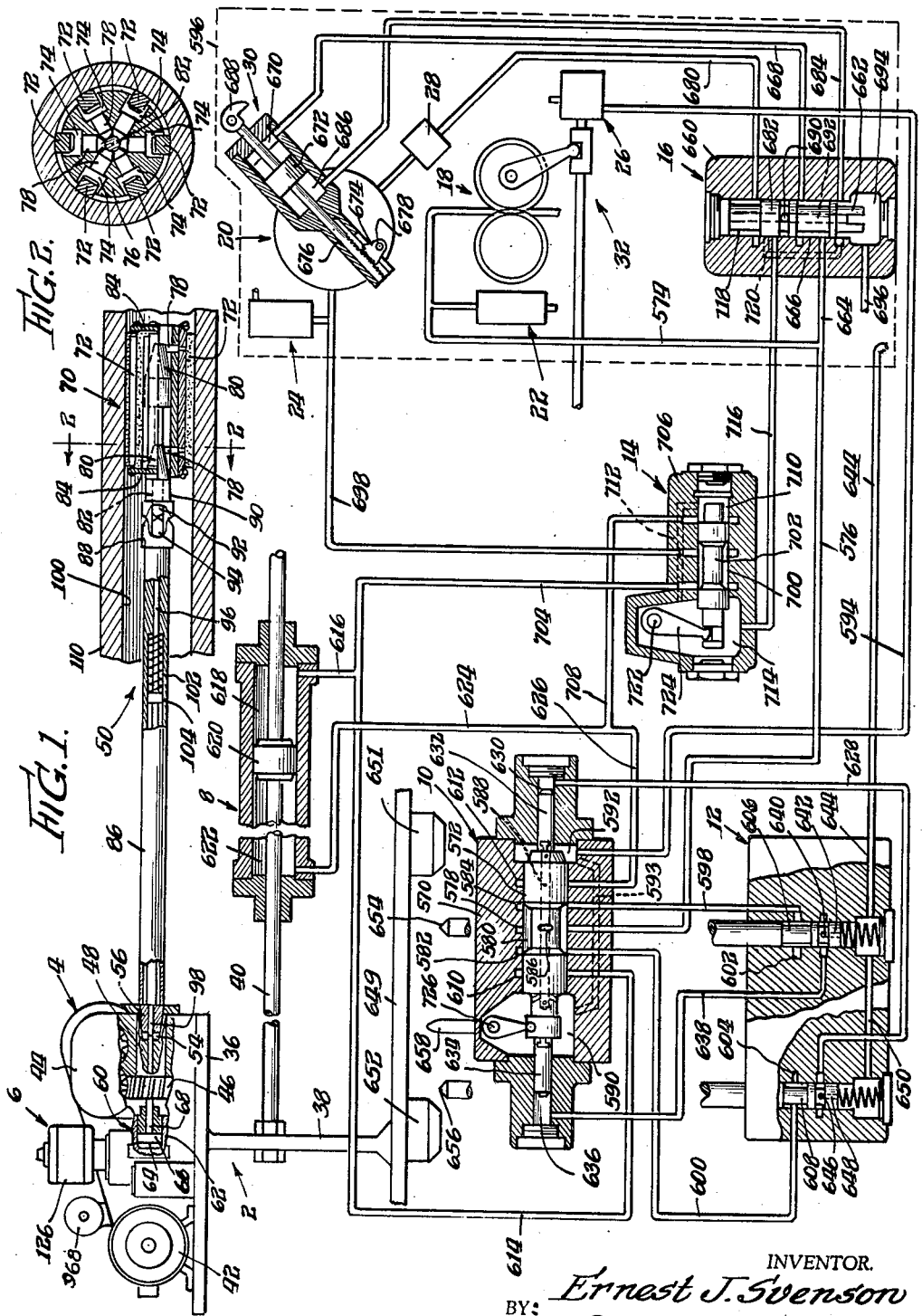
INVENTOR.
Ernest J. Svenson
BY: Cox Moore & Olson
attys.

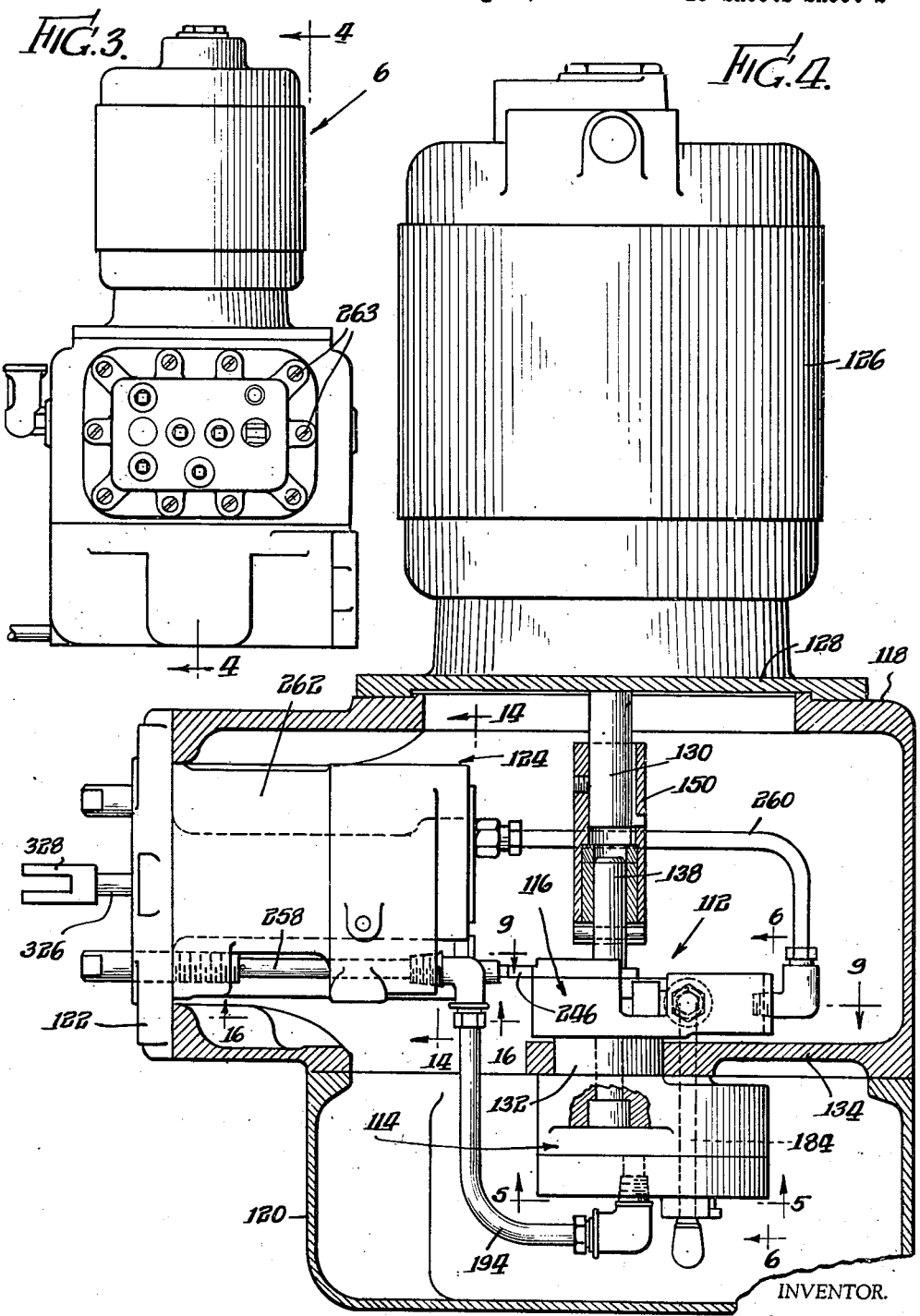

Sept. 19, 1944.  E. J. SVENSON  2,358,361
MATERIAL WORKING APPARATUS
Filed Aug. 2, 1940  10 Sheets-Sheet 3
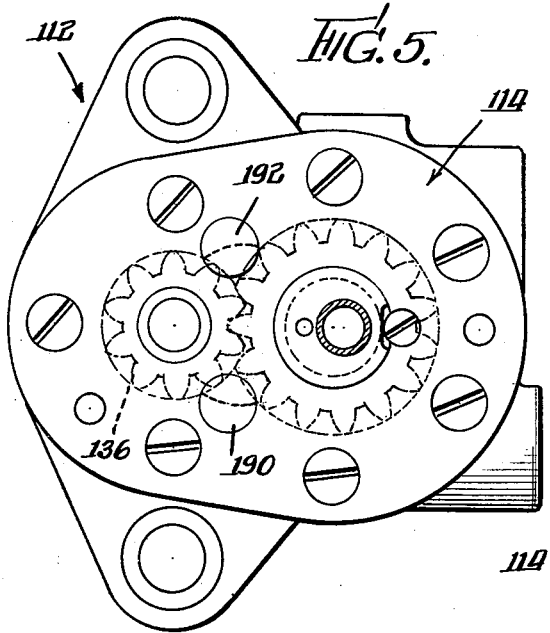
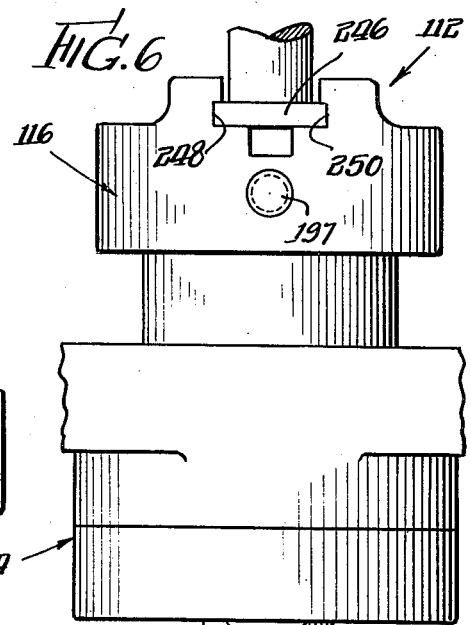
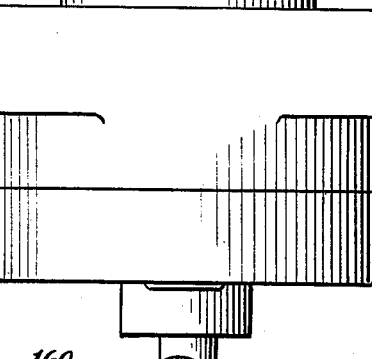
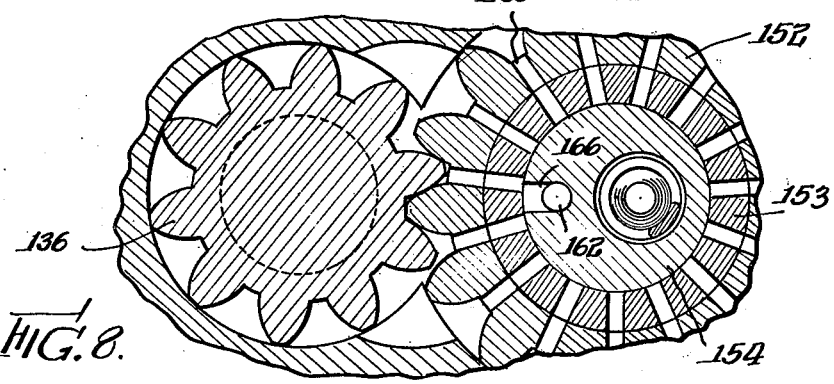
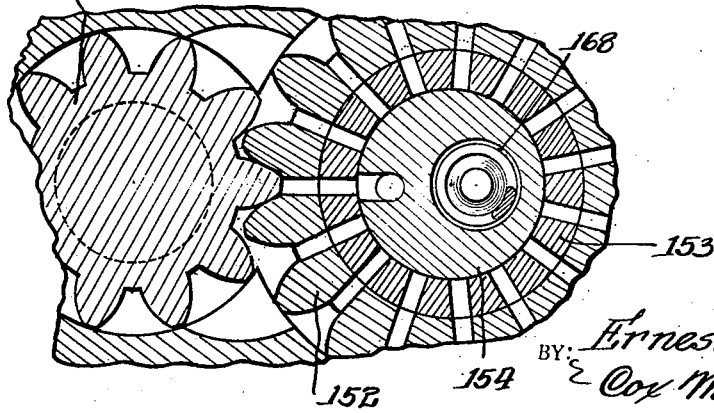
INVENTOR.
Ernest J. Svenson
BY Cox Moore & Olson
attys.

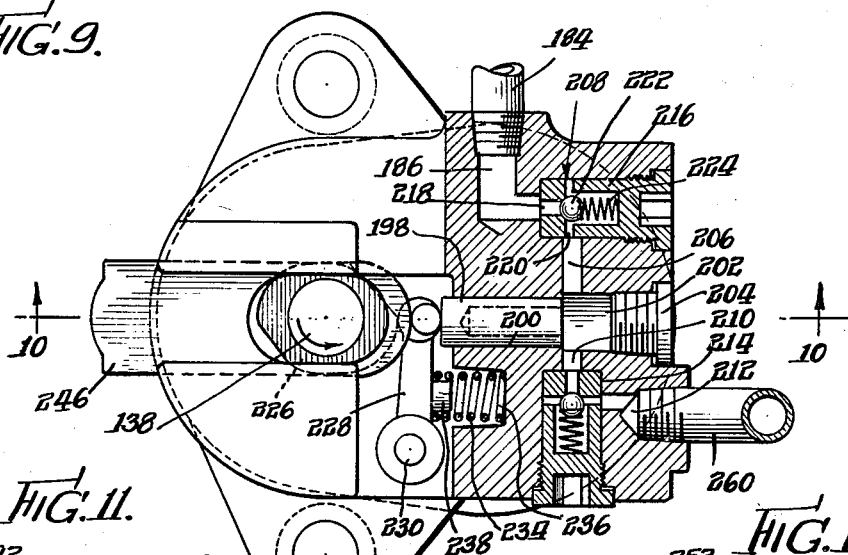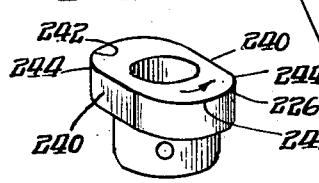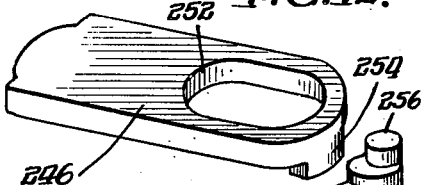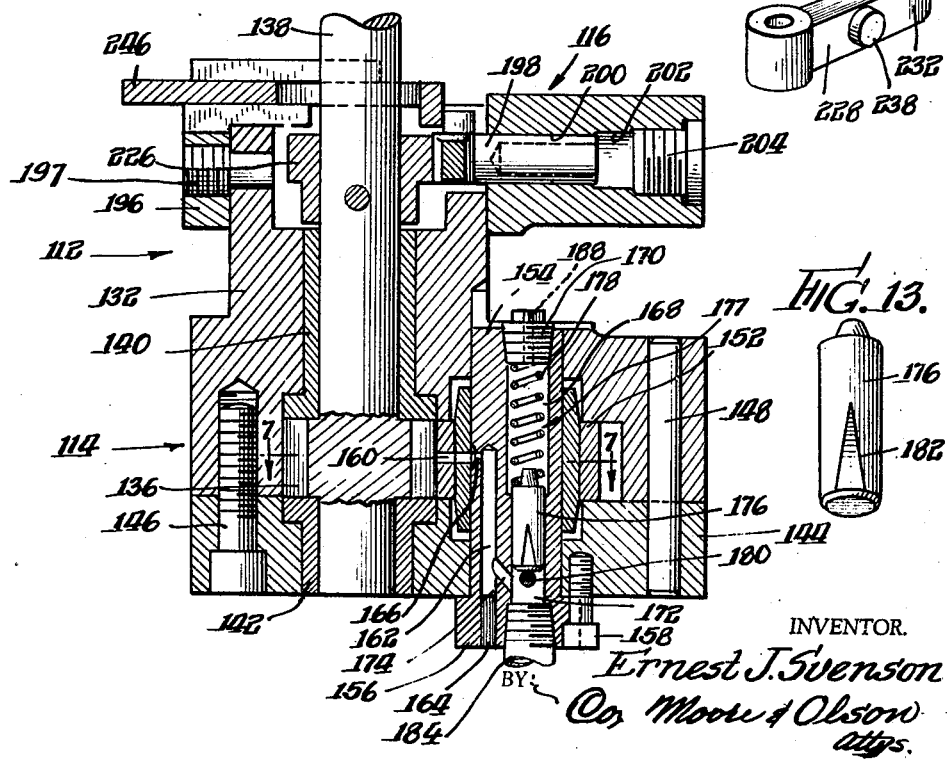

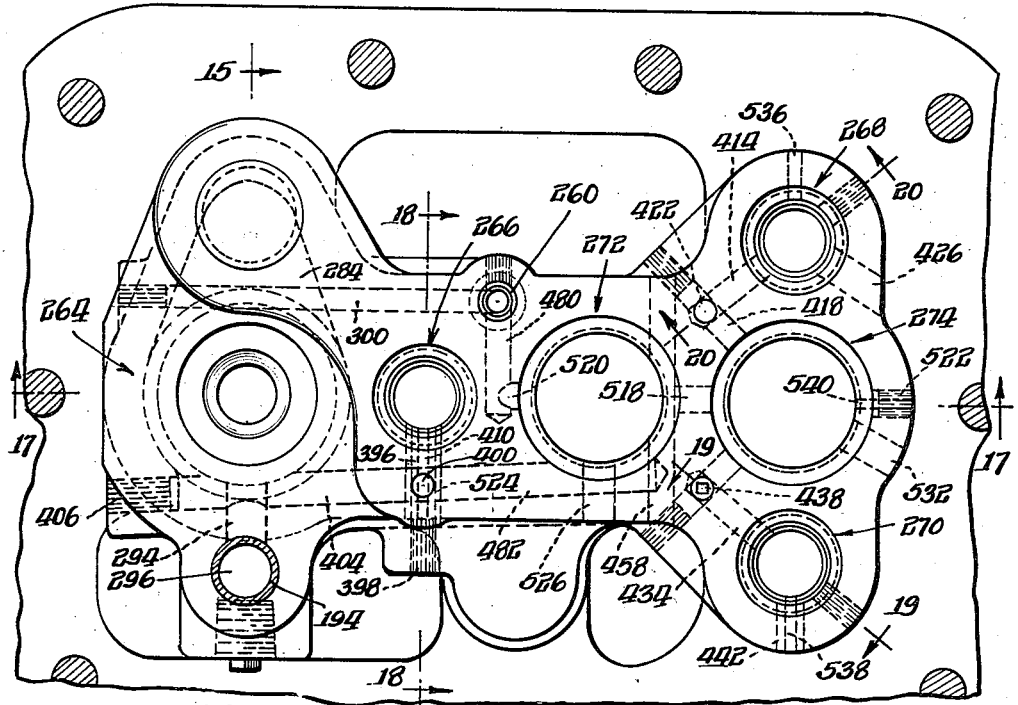

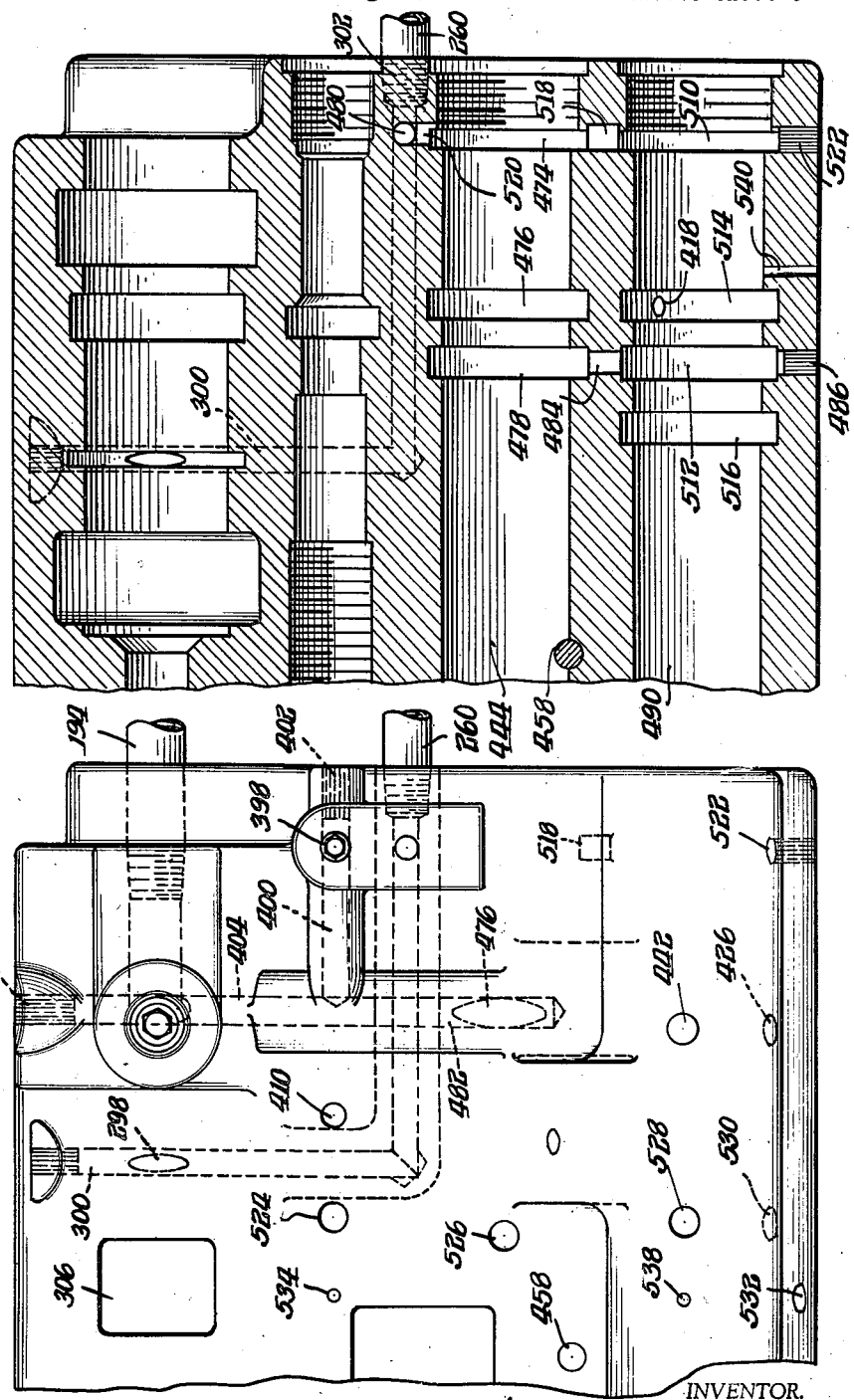

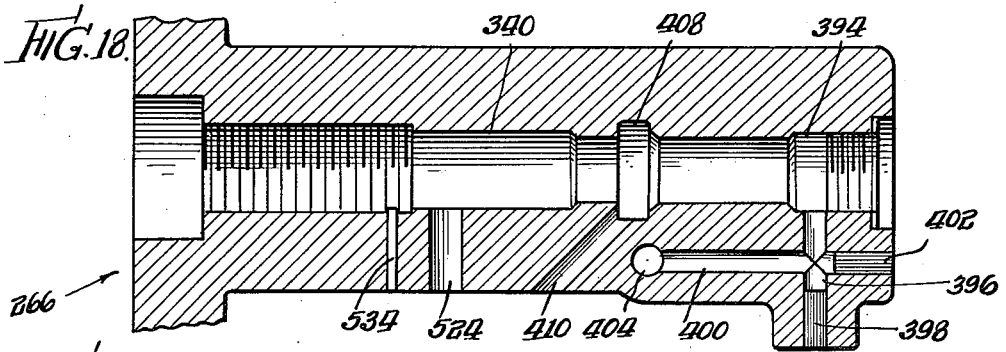
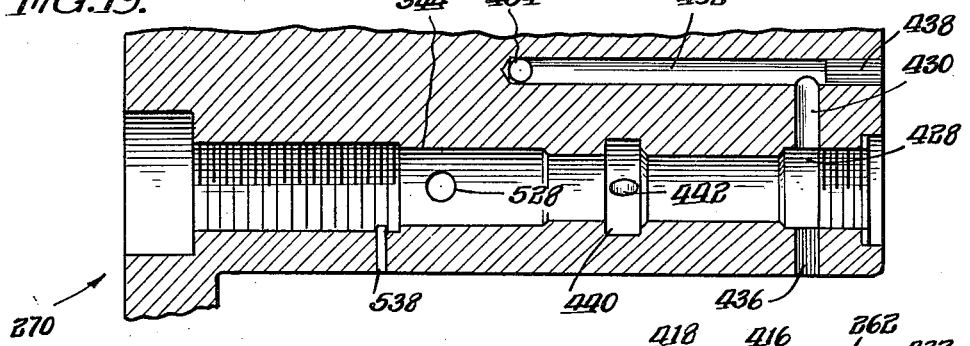
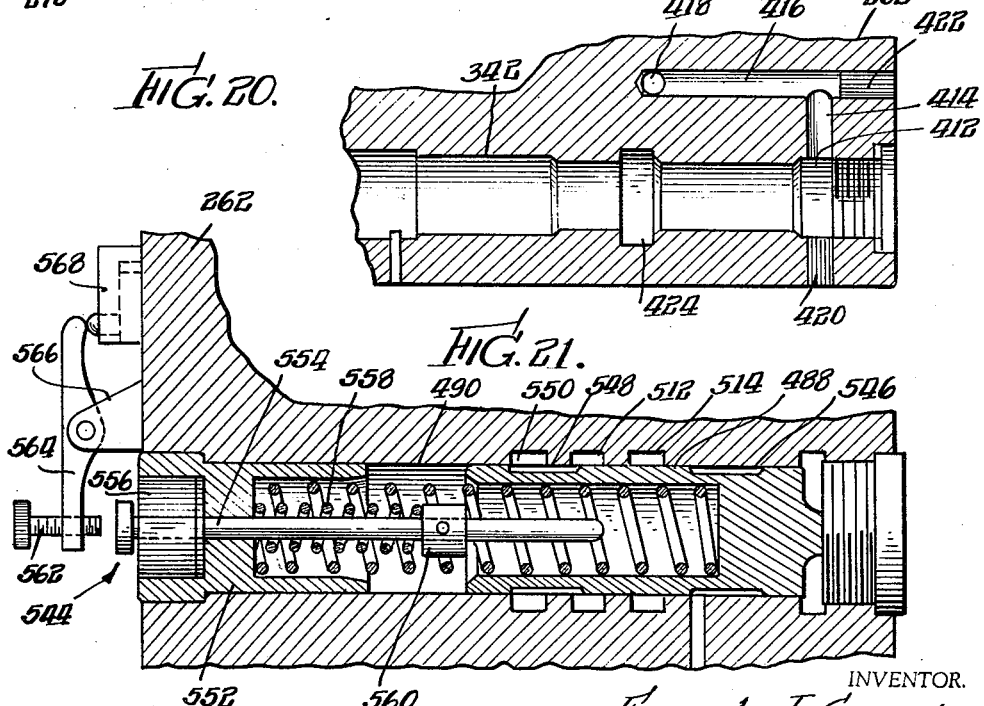

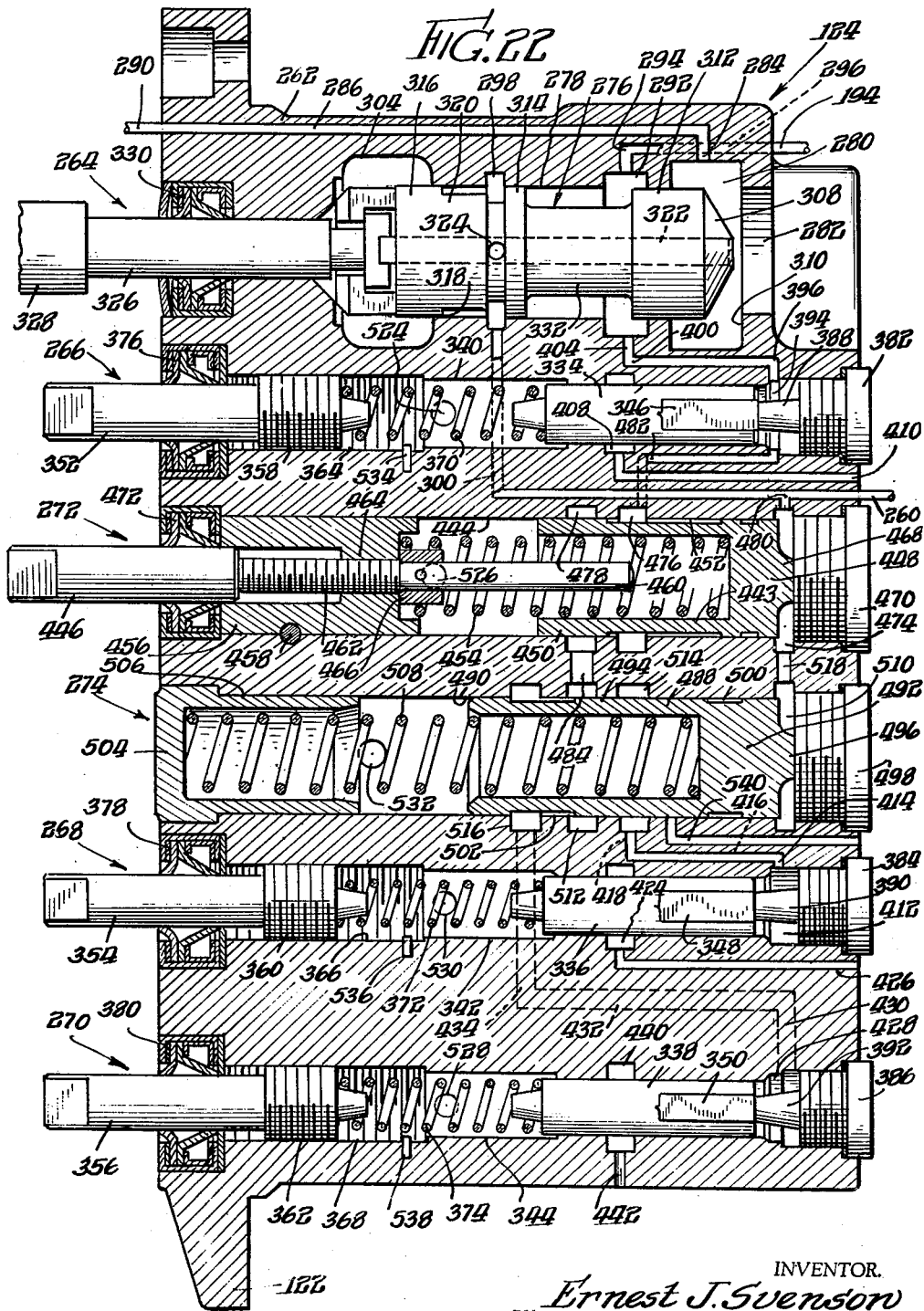

Sept. 19, 1944.   E. J. SVENSON   2,358,361
MATERIAL WORKING APPARATUS
Filed Aug. 2, 1940   10 Sheets-Sheet 9
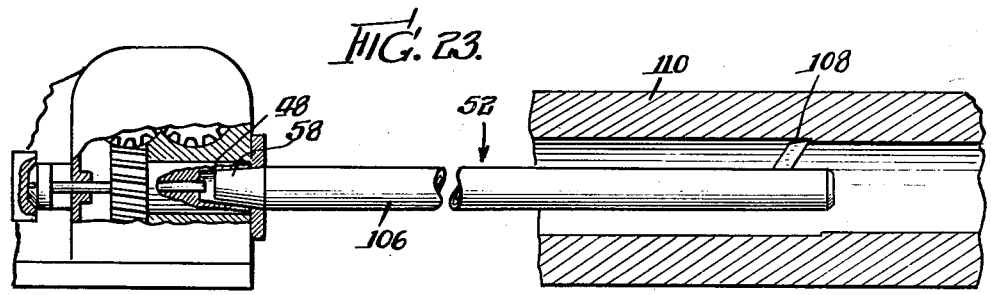
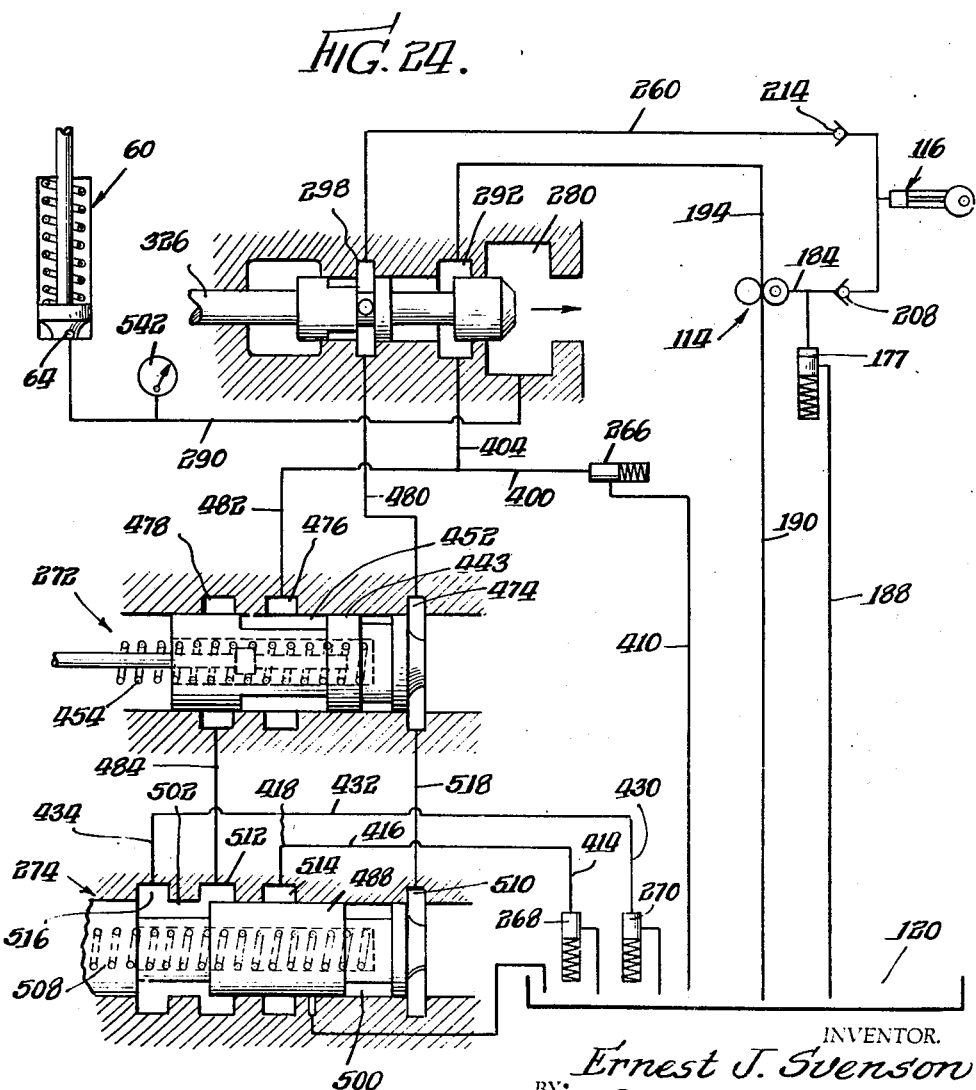
INVENTOR.
Ernest J. Svenson
BY Cox Moore & Olson
attys.

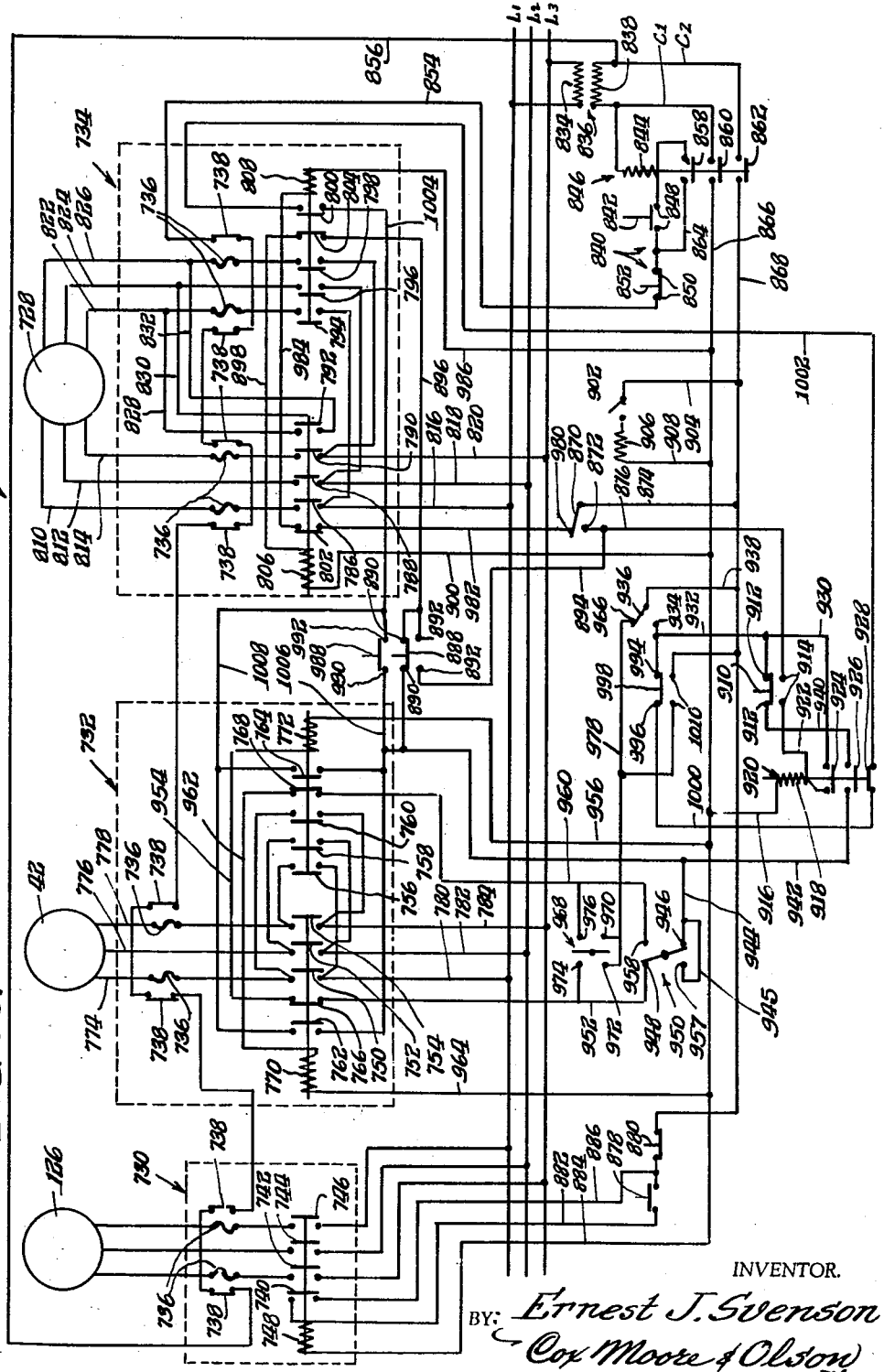

Patented Sept. 19, 1944

2,358,361

UNITED STATES PATENT OFFICE 2,358,361

MATERIAL WORKING APPARATUS

Ernest J. Svenson, Rockford, Ill., assignor, by mesne assignments, to Odin Corporation, Chicago, Ill., a corporation of Illinois Application August 2, 1940, Serial No. 349,841

11 Claims. (Cl. 51—34)

This invention relates to material working apparatus, and more particularly to an electrically controlled fluid actuator system in a material working apparatus.

It is an object of my invention to provide a fluid pressure system including a plurality of individually adjustable, pressure determining devices which may be rendered effective successively.

It is also an object of my invention to provide in a system of the above stated character automatic means for rendering the respective pressure determining devices effective in a preselected sequence and for timing the period for which each of such devices is effective.

A further object of my invention is to provide in a honing machine a fluid actuated honing tool expansion control system embodying a plurality of individually adjustable pressure determining devices controlling the expansion of the honing tool, and automatic means for rendering the respective devices effective in a preselected sequence, and each for a preselected time period.

The invention also contemplates the provision of a hone expander system or unit whereby the expanding force exerted on the honing element or elements changes from time to time during a honing operation, as required by the character of the work being done.

It is a further object of my invention to provide a combined honing and boring machine embodying an electro-hydraulic or fluid actuator and control system and including a properly interrelated fluid pressure generating means, fluid pressure control means and fluid directing means which are adjustable and selectively operable to cause feeding and traversing movements of the working or cutting tool at selective rates best suited to the character of the work to be done and to cause the tool to engage the material being worked at working pressures best suited to the character of the work, the nature of the material and the changing condition of the material as the working thereof progresses.

Further and other objects and advantages will be apparent from the following description when taken in connection with the accompanying drawings, wherein:

Figure 1 is a schematic or diagrammatic drawing and hydraulic layout of a combined honing and boring machine embodying the invention;

Figure 2 is a view in vertical section of the honing tools taken along the line 2—2 of Figure 1;

Figure 3 is a view in elevation of the hone expander control unit or mechanism forming a part of the machine;

Figure 4 is an enlarged view of the expander control unit in vertical section taken substantially along the line 4—4 of Figure 3;

Figure 5 is an enlarged view in horizontal section taken along the line 5—5 of Figure 4 illustrating the gear pump of the expander control unit;

Figure 6 is an enlarged view in vertical section taken substantially along the line 6—6 of Figure 4;

Figure 7 is a fragmentary enlarged view in horizontal section taken along the line 7—7 of Figure 10, also illustrating the expander control unit gear pump;

Figure 8 is a view similar to Figure 7 but with the parts in a different position of operation;

Figure 9 is an enlarged view in horizontal section taken substantially along the line 9—9 of Figure 4 illustrating the plunger pump of the expander control unit;

Figure 10 is a view in vertical section taken substantially along the line 10—10 of Figure 9;

Figures 11, 12, and 13 are views in perspective of parts of the mechanism shown in Figures 9 and 10;

Figure 14 is an enlarged fragmentary view in elevation and partly in section taken along the line 14—14 of Figure 4 illustrating the pressure determining and timing device of the expander control unit;

Figure 15 is a fragmentary view in vertical section taken along the line 15—15 of Figure 14;

Figure 16 is an enlarged view in plan and partly in section taken along the line 16—16 of Figure 4;

Figure 17 is a fragmentary vertical section taken along the line 17—17 of Figure 14;

Figure 18 is an enlarged fragmentary view in vertical section taken along the line 18—18 of Figure 14;

Figures 19 and 20 are enlarged fragmentary views in vertical section taken along the lines 19—19 and 20—20, respectively, of Figure 14;

Figure 21 is a sectional view showing a valve modification of the unit disclosed in Figures 3 to 20;

Figure 22 is a schematic or rolled-out diagram of the time and pressure control valve mechanism of Figures 14 to 21;

Figure 23 is a fragmentary view in elevation and partly in section showing the substitution of a boring tool for the honing tool disclosed in Figure 1;

Figure 24 is a schematic fluid circuit diagram of the hone expander unit; and

Figure 25 is a schematic diagram of the electric control circuit of the machine.

As shown in the drawings, the machine embodying the invention comprises a headstock or carriage 2 (Fig. 1) carrying a tool receiving and rotating drive mechanism 4 and a hone expander unit or mechanism 6; a fluid actuator or motor 8 for causing reciprocatory feeding and traversing movements of the headstock or carriage 2;

control valves 10, 12, 14 and 16, which control fluid connections between the fluid pressure generating devices or feed pumps 18 and 20 and the fluid actuator or motor 8 for controlling the actuator direction and rate of travel; pressure relief valves 22 and 24 for the feed pumps 18 and 20, respectively; an adjustable fluid pressure determining device, orifice or restriction 26; a filter 28 for the pump 20; a fluid actuator 30 automatically controlling or varying the displacement and rate of fluid feed of the pump 20; and an electric control system 34 (Fig. 25).

The headstock 2 comprises a base or support 36 mounted in any convenient manner for rectilinear movement or reciprocation along suitable ways or guides (not shown). The base 36 is connected as by a depending part 38 to a reciprocating driving rod 40 of the fluid actuator or motor 8.

The tool receiving and rotating mechanism 4 comprises an electric motor 42 which, through a belt (not shown) drives a change-speed gear mechanism 44. The gear mechanism drives a worm wheel 46 fastened to a spindle 48. The spindle 48 drives the honing tool 50 (Fig. 1) or the boring tool 52 (Fig. 23). A detachable coupling between the tool and the spindle is preferably effected by providing the outer end of the spindle with a frustoconical aperture 54 receiving the slightly tapered, frustoconical end portion 56 of the honing tool 50 (Fig. 1) or the slightly tapered frustoconical end portion 58 of the boring tool 52 (Fig. 23).

The hone expander unit or mechanism 6 (subsequently to be described in detail) includes a fluid pressure hone expanding actuator 60. The fluid pressure hone expanding actuator 60 comprises a cylinder 62 having a combined inlet and outlet port 64; a piston 66; and a piston rod 68. The rod 68 extends from the cylinder 62 through a central opening in the worm wheel 46 and a central opening in the spindle 48 into the frustoconical aperture 54. The honing head 70 of the honing tool 50, which honing head may be of any suitable or conventional structure, is shown for purposes of illustration as comprising a plurality of abrasive honing sticks 72 mounted in angularly spaced frames 74 (Fig. 2) shiftably secured in angularly spaced grooves extending longitudinally of the surface of a cylinder 76. Each of the frames 74 is provided with a pair of axially spaced pins 78 (Figs. 1 and 2) extending radially of the cylinder 76 and engaging frustoconical cam surfaces 80 formed upon a hone expanding rod 82 extending axially of the cylinder. Parts of the frames 74 extend beyond the ends of the sticks 72 and are encompassed by coil springs 84, which function to urge the frames back into receded positions in the bases of the frame receiving grooves of the cylinder 76.

The honing head is rotated by the spindle 48 through a hollow bar or sleeve 86 of the honing tool, which bar is coupled to the honing head by the universal coupling 88. The honing head includes a sleeve 90 formed integral with and fastened to the cylinder 76 and connected to the universal coupling 88. The semi-spherical or rounded end 92 of the expander rod 82 of the honing head is slidably received in the sleeve 90 and coupling 88 and abuts the semi-spherical or rounded end 94 of a push rod 96 slidably mounted in the hollow bar or sleeve 86. The end 98 of the push rod 96 extends beyond the end portion 56 of the hollow bar or sleeve 86 into the frustoconical aperture 54 in the spindle 48 and into juxtaposition to the outer end of the piston rod 68. Hence, when the piston 66 moves to the right (Fig. 1), the rod 68 engages the push rod 96 and moves the latter to the right, so that it pushes upon the rod 82 of the honing head and through the cam surfaces 80 expands the honing sticks 72 into pressure engagement with the surface 100 to be honed. The pressure existing in the cylinder 62 to the left of the piston 66 determines the force by which the abrasive honing sticks are pressed against the work.

A coil spring 102 within the hollow bar 86 and embracing the push rod 96 is interposed between an internal shoulder of the bar and the collar 104 on the push rod so as to urge the push rod to the left in Figure 1 and return the piston 66 to the left end of the cylinder 62 when the port 64 is connected to a fluid discharge line or reservoir. The movement of the push rod 96 to the left in Figure 1 permits an instantaneous collapse of the honing sticks under the action of the springs 84.

The abutting spherical ends 92 and 94 of the rods 82 and 96 allow free action of the universal coupling 88 as the tool follows the work.

The boring tool 52 (Fig. 23) may be of any suitable construction, comprising, for example, a bar 106 having at one end the portion 58 for coupling with the spindle 48 and at its opposite end a boring bit or cutter 108. The sectionally shown cylinder 110 (Figs. 1 and 23) represents the work piece to be bored or honed.

To facilitate further description of my invention as embodied in a combined honing and boring machine, the machine may be considered as comprising, in addition to the hone expander unit or mechanism 6, a hydraulic system for honing; a hydraulic system for boring; and an electrical control system. These will be described in detail in the order named.

*The hone expander unit*

The conventional honing tool exerts a substantially constant pressure on the abrasive honing sticks during the whole operation, unless the machine is stopped and the machine or tool readjusted. In many kinds of work it is found necessary or desirable to alter the expansive pressure during the honing operation. It is also necessary or desirable that the several pressures be preselectable; that the changes in pressure occur automatically in predetermined sequence; and that the several pressures exist for preselectable time periods. For efficiency and accuracy in operation the tool should not be stopped for the making of these changes. My fluid operated hone expander unit about to be described possesses these desirable features and permits honing operations to be performed in this desirable manner.

When the hone expander unit is idle, the fluid or hydraulic pressure in the operating chamber of the fluid pressure hone expanding actuator 60 is substantially zero and the spring 102 holds the piston 66 to the left, as shown in Figure 1, and the honing sticks may be collapsed by the springs 84. To expand the honing sticks, fluid under pressure is introduced into the cylinder 62 to cause the piston 66 and the piston rod 68 to move outwardly, or to the right in Figure 1, and cause the desired expansion. Thus, when the abrasive honing sticks come in contact with the work, they are pressed against it by a force determined by the fluid pressure existing in the cylinder 62.

The source of fluid under pressure for expanding the honing tool, and for other purposes as will later appear, is the unitary pumping device 112 (Figs. 4 to 10) formed within and as a part of the hone expander unit 6. This pumping device consists of a gear pump 114 and a plunger or piston pump 116. The pumping device 112 is mounted in a casing or housing 118 having an open bottom enclosed by a bowl or tank 120 forming a fluid reservoir. The housing 118 is also open along one side and this opening in the side of the housing is closed by the mounting plate or housing flange 122 of a pressure determining and timing device 124 enclosed within the housing 118. The pressure determining and timing device controls the operation of the expander unit, as will presently be described. The housing 118 is surmounted by an electric motor 126 which may, if desired, be supported on the top or cover plate 128. The motor shaft 130 projects into the housing, as shown in Figure 4. The casing 132 of the unitary pumping device 112 may be secured in any convenient manner to the inwardly extending flange or shelf 134 of the housing 118, so that the plunger or piston pump 116 lies above the shelf, and the gear pump 114 lies below the shelf and in the fluid within the tank 120. If desired, the entire housing 118 may be used as a fluid reservoir.

The gear pump 114, which is basically similar to, but an improvement upon, the gear pump shown in my prior Patent 1,912,738, comprises a gear 136 (Figs. 5, 7, 8 and 10), the teeth of which are formed integral with or cut in a shaft 138. The shaft 138 is journaled in a bushing 140 (Fig. 10) mounted in a bore of the casing 132 and in a bushing 142 mounted in a cover plate 144 secured to the casing 132 as by screws 146 and pins 148. The shaft 138 is driven by the electric motor 126 through a suitable coupling 150 (Fig. 4).

The pump gear 136 meshes with a like pump gear 152 secured to a sleeve 153 journaled on a shaft or stud 154. The shaft 154 is received in an opening formed in the casing 132 and the cover plate 144 and is provided with an enlarged part 156 extending over the cover plate 144 and fastened thereto as by the head of the screw or bolt 158.

The pumping gear 152 and sleeve 153 are provided with angularly spaced radial openings 160 extending between the teeth of the gear from the base of the teeth to the inner bore of the sleeve. The shaft or stud 154 is provided with a longitudinal, off-center bore or passage 162 closed at its outer end by a plug 164, the passage 162 being in communication with a radial passage 166 positioned in the plane of the radial openings 160 of the gear 152 and sleeve 153. The opening 166 is positioned on a straight line between the centers of the gears 136 and 152, and therefore, as the mating teeth of the gears move from the positions shown in Fig. 7 to the positions shown in Fig. 8 fluid communication with the radial shaft opening 166 is transferred from one radial groove 160 to the next so that fluid trapped between the intermeshing gear teeth is substantially continuously discharged through the opening 166. The shaft or stud 154 is further drilled longitudinally from one end to the other to provide an eccentric bore 168. The upper end of the bore 168 is closed by a plug 170 and the lower end portion or chamber 172 of this bore is in fluid communication with the passage 162 by an inclined lateral passage 174. A plunger 176 of a pressure relief valve 177 is slidably mounted in the lower, reduced portion of the bore 168 and is normally urged by the spring 178 against a stop pin 180, which projects into the bore in position to hold the plunger above the upper edge of the lateral passage 174. The spring 178 is interposed between the plunger 176 and the plug 170 within the enlarged portion of the eccentric bore 168 and urges the plunger against the stop pin 180.

The plunger 176 is provided with a tapered, surface groove 182 extending longitudinally of the plunger for a portion of its length, as best shown in Figure 13. A conduit 184 is threaded into the chamber 172 of the bore 168, and connects this chamber to an inlet port 186, Fig. 9, of the plunger or piston pump 116, for a purpose later to be described. An opening or passage 188 through the plug 170 establishes fluid communication between the upper enlarged portion of the eccentric bore 168 and the fluid within the reservoir or tank 120. Thus the plunger 176 and its associated spring 178 constitute a relief valve for limiting the pressure in the chamber 172.

Fluid is supplied to the gear pump 114 through an inlet port 190 (Fig. 5) which is in open communication with the fluid in the reservoir 120 and is expelled through the port 192 which is connected by the conduit 194 to the pressure determining and timing device 124.

As the shaft 138 is rotated, the gears 136 and 152 run together as a gear pump drawing fluid into the port 190 from the reservoir and expelling it through the port 192. In Figure 7 a tooth of the gear 136 is shown just entering the space between an adjacent pair of teeth of the gear 152. As this engagement of teeth continues, a small quantity of fluid is trapped and a passage 160 is brought into registry with the radial opening 166 in the shaft or stud 154. Thus, the trapped fluid is expelled through the openings or passages 166, 162 and 174 into the chamber 172 from which it is discharged to the plunger or piston pump 116 through the conduit 184. This escape for trapped fluid prevents the creation of heavy stresses between the gears and also serves as a source of charging fluid for the plunger or piston pump, as will later appear.

The plunger or piston pump 116 comprises a pump casing 196 secured to the upper end of the casing 132 in any convenient manner as by the screws 197, Fig. 10. A plunger or piston 198 is free to reciprocate in the bore 200 of the casing 196. An enlarged portion of the bore 200 forms a pumping chamber 202 closed by the cylinder head or screw plug 204. An inlet port or passage 206, Fig. 9, to the pumping chamber 202 communicates with the inlet port 186 of the plunger pump through a ball check valve 208; and the outlet port or passage 210 of the pumping chamber communicates with the outlet port 212 of the plunger pump through a ball check valve 214. Each of these ball check valves comprises a housing 216 inserted in a suitable opening in the pump casing 196 and secured thereto in any suitable manner, as by threading into receiving openings in the pump casing. Each housing is provided with axial and radial passages 218 and 220 communicating with the connecting passages in the pump casing. A ball valve 222 is urged by a spring 224 into position upon a valve seat formed at the intersection of the passages 218 and 220. The valve 208 permits substantially free flow of fluid from the pump inlet port 186 to the passage 206, but prevents flow in an opposite direction. The valve 214 permits a flow of fluid from the passage 210 to the pump outlet port 212, but prevents flow in a direction from the port 212 to the passage 210.

Since the chamber 172 of the gear pump is connected by the conduit 184 to the plunger pump inlet port 186, the pressure of the fluid in the chamber 172 is exerted through the check valve 208 against the inner end of the plunger or piston 198 and thus tends to force that plunger outward or to the left, as seen in Fig. 9. When the plunger is driven inward or to the right, the check valve 208 closes and fluid at a higher pressure is expelled through the check valve 214 and the plunger pump outlet port 212. The spring of the ball check valve 214 is considerably stiffer than the spring of the ball check valve 208 so that fluid entering the pumping chamber through the check valve 208 will not pass out from the pumping chamber through the check valve 214 without the compressive action of the plunger 198.

The plunger 198 is actuated by a cam 226 pinned to the shaft 138, the cam causing oscillation of a plunger operating finger or lever 228 about its pivot pin 230. The finger or lever 228 has an enlarged, rounded, outer end 232 as best seen in Figure 12 which is adapted to engage and operate the plunger 198. A coil spring 234 mounted in a pocket 236 of the casing 196 embraces the lateral lug 238 formed on the finger or lever 228 and urges the latter in a counterclockwise direction as seen in Figure 9 so that the rounded end portion 232 is maintained in engagement with the cam 226.

The cam 226 is of the two-lobed type, and as best seen in Figure 11 is formed to provide two opposing flat cam surfaces 240 joined by opposing rounded cam surfaces 242. Each of the cam surfaces 242 is made up of a rising surface portion extending from a lobe 244 through an angular distance of substantially ninety degrees in a direction opposite to the angular direction of rotation of the cam, and a portion of constant radius which extends to a point of tangency with the succeeding flat surface. Thus as a lobe 244 of the cam approaches the finger 228 during a revolution of the cam, inward motion is transmitted through the head 232 to the plunger 198 and the fluid under a desired pressure is expelled by way of the passage 210 and the check valve 214 to the pump outlet port 212. As a lobe 244 recedes from the finger, fluid, entering the chamber 202 through the check valve 208 and the passage 206, causes the plunger 198 to move to the left and the head 232 to follow and be maintained in engagement with the surface of the cam 226 unless the outward movement of the finger is limited, as will presently be described.

Thus, continued rotation of the cam 226 produces a reciprocating motion of the plunger or piston 198 and a consequent continuous delivery of fluid to the plunger pump outlet port 212. The purpose of the finger or lever 228 is to prevent transmission of side thrust to the plunger 198 from the cam 226.

As will later appear, it is necessary or desirable that the rate of delivery, that is, the volume of fluid delivered per minute by the plunger pump 116 be adjustable at will. For this purpose, the plunger pump is provided with an adjusting means, member or slide bar 246 slidable in the grooves 248 and 250, Fig. 6, formed in the top of the casing 196. The slide bar 246 is formed with an elongated opening 252, Fig. 12, which receives the shaft 138 and therefore permits the slide bar to straddle the shaft. At its forward end the bar is provided with a depending lug 254 having a forward rounded surface for engaging a pin 256 upstanding from the outer rounded end 232 of the finger 228. Adjustment of the slide bar to the right as seen in Figures 4, 9 and 10, may be effected by an adjusting screw 258 (Fig. 4) adjustably mounted in the housing of the pressure determining and timing device 124. The adjusting screw 258 at its inner end abuts the slide bar 246. Thus, when the slide bar is adjusted inward or to the right for less than the maximum pump delivery, the lug 254 will be engaged by the pin 256 as the plunger 198 and finger 228 move outward or to the left, and hence the finger 228 will not be permitted to move outward to the furthermost position permitted by the contour of the cam. Hence the stroke of the plunger or piston 198 will be shortened by adjusting the slide bar 246 inward or to the right, and the speed of the shaft 138 being maintained constant, the rate of delivery, that is, the volume of fluid delivered by the plunger pumps per minute, will be decreased. Similarly, adjustment of the slide bar to the left permits an increase in the plunger or piston stroke and hence effects an increase in the rate of delivery of the fluid. It will be evident that as the adjusting screw 258 moves to the left as seen in Figure 4, the slide bar 246 will be released for outward movement upon the next outward movement of the plunger 198 and the slide bar thus moved to its new position of adjustment determined by the screw 258. If desired, the screw 258 may be suitably secured at its inner end to the outer end of the slide bar so that the latter will be positively moved outward or to the left upon adjustment of the screw.

It should be here noted that one lobe 244 of the cam 226 may be of greater radial distance from the center of the cam, so that for very low rates of delivery the slide 246 may be adjusted to position the lug 254 relative to the cam center at a distance exceeding the radial length of one lobe but less than the radial length of the other lobe. Hence, only one lobe will then be effective to actuate the pump plunger and the rate of delivery thus reduced.

The plunger pump outlet port 212 is connected by the conduit 260 (Figs. 4 and 9) to an inlet chamber or passage of the pressure determining and timing device 124.

The pressure determining and timing device 124 comprises as shown in Figures 3, 4, 14 to 20, 22 and 24, a housing 262 mounted in the housing 118 and having the outwardly extending peripheral flange or mounting plate 122 receiving suitable mounting bolts 263 (Fig. 3). Within the housing 262 there are mounted, as best shown in the schematic diagram of Figure 22, a main control valve 264, a plurality of pressure control or relief valves 266, 268 and 270, and a plurality of timing valves 272 and 274. In the particular embodiment set forth, the valve 266 may be set for high pressure relief, the valve 270 for an intermediate pressure relief, and the valve 268 for low pressure relief.

The main control valve 264 comprises a valve body or plunger mounted in a bore 278 of the housing 262. The valve bore 278 is formed to provide an enlarged chamber 280 (Figs. 14, 15, 17, 22 and 24) which communicates with a bore 282 through which the fluid may be discharged into the reservoir or tank 120. The chamber 280 is also connected by a lateral passage 284 (Figs. 14 and 15) to a longitudinal passage 286 which is closed at one end as by a plug 288 and receives in its other end the conduit 290 which, as diagrammatically indicated in Figure 24, is connected to the port 64 of the fluid pressure hone expander actuator 60.

An enlarged chamber 292 of the valve bore 278 is connected by a lateral passage 294, Fig. 15, to a longitudinal passage 296 to which the conduit 194 from the gear pump is connected. A chamber 298 of the valve bore 278 is connected by a passage 300, Figs. 14, 15 and 22, to the port 302 to which the conduit 260 from the plunger pump 116 is connected (see also Figs. 16 and 17). The enlarged chamber 304 of the valve bore 278 forms a drain from which the fluid flows through an opening 306 back into the reservoir or tank 120.

The valve 276 has a frustoconical end portion 308 (Fig. 22) adapted to engage a valve seat formed by the shoulder 310 of the housing 262 and to control the connection of the chamber 280 to the reservoir through the port 282. The cylindrical portion 312 of the valve snugly fits the wall of the bore between the chambers 280 and 292 and serves as a valve controlling communication between the chambers. A cylindrical portion 314 of the valve snugly fits the bore 278 and prevents fluid communication between the chamber 298 and the chamber 292. A cylindrical portion 316 snugly fits the bore 278 and provides a shoulder 318 formed by the reduced portion 320 of the valve. The portions 316, 318, and 320 form a valve controlling fluid communication between the passage 298 and the bore 278.

The valve plunger is also formed with an axial passage 322 communicating with a radial passage 324 to the left of the valve portion 314. These passages 322 and 324 establish fluid communication between the chamber 298 and the chamber 280 when the valve is in the position shown in Figure 22. The valve body 276 is coupled in any convenient manner to a sliding valve stem or operating rod 326 provided at its outer end with a bifurcated coupling 328 (Figs. 4 and 22), which through a suitable linkage may be connected to a manual actuator (not shown) or to the core of an actuating solenoid, later to be described. Fluid leakage along and around the stem 326 may be prevented by a suitable seal 330.

If the valve body 276 is in the position shown in Figure 22, which is its neutral or inactive position, fluid delivered by the plunger pump 116, which may be termed a metering pump, is delivered through the conduit 260 and passage 300 to the chamber 298 from which it passes into the bore 278 and from the bore through the radial passage 324 and the axial passage 322 into the chamber 280. The chamber 280 being open to the reservoir through the bore 282 the metering pump 116 simply pumps fluid back into the reservoir.

The chamber 292 is cut off from fluid communication with the chamber 280 by the valve portion 312 and is connected through passages (to be described) to the reservoir. These passages are controlled by the valve 266. Hence, when the valve body 276 is in the position shown in Figure 22, the gear pump, which may be termed a feed pump, delivers fluid through the conduit 194, the passages 296 and 294, the chamber 292 and back to the reservoir from this chamber at a pressure determined by the setting of the valve 266.

To initiate a working cycle, the actuator for the valve stem 326 must be moved to shift the valve stem and the associated valve body 276 to the right of the position shown in Figure 22. When the valve body 276 is in this active position the port 282 is closed by the valve portion 312, and hence the chamber 280 is sealed from the reservoir. The chamber 280 is now connected to the chamber 292 by the reduced portion 332 of the valve body. Also, since the shoulder 318 will have passed to the right of the chamber 298 the portion 316 of the valve body cuts off fluid communication between this chamber and the valve chamber 278, and the chamber 298 is sealed from the radial passage 324. Therefore, with the valve body 276 in its extreme position to the right (with reference to Fig. 22), the fluid delivered by the feed pump 114 will be directed from the chamber 292 to the chamber 280, and then through the passages 284 and 286 to the conduit 290, through which the fluid is conveyed, as schematically indicated in Figure 24, to the port 64 of the fluid pressure hone expander actuator 60.

Fluid delivered by the metering pump 116 is now prevented from being discharged directly to the reservoir because of the sealing of the radial passage 324 from the chamber 298. As will later appear, the fluid delivered to the chamber 298 by the metering pump 116 is employed to actuate the pressure control and timing valves 266, 268, 270, 272 and 274, and under the control of these valves is returned to the reservoir.

The pressure control valves 266, 268 and 270 comprise valve plungers 334, 336, and 338 (Fig. 22) slidable in valve bores 340, 342, and 344, respectively, as best shown in Figures 18, 19 and 20. The valve plungers 334, 336 and 338 are provided with flat portions or grooves 346, 348 and 350, respectively (Fig. 22) extending inwardly from their righthand ends along the surfaces of the plungers in an axial direction. These valves also include adjusting rods or stems 352, 354 and 356 having externally threaded portions 358, 360 and 362 received in internally threaded portions 364, 366 and 368 of the valve bores 340, 342 and 344, respectively. Coil springs 370, 372 and 374 are mounted in the valve bores and interposed between the adjusting rods 352, 354 and 356 and the valve plungers 334, 336 and 338, respectively. These springs, the tensions of which are determined by the adjusting rods 352, 354 and 356 in turn determine the pressures at which the plungers 334, 336 and 338 will be moved to the left (Fig. 22). Leakage around the adjusting rods 352, 354 and 356 is prevented by the seals 376, 378 and 380, respectively, which may be of any suitable construction.

Movements of the plungers to the right are limited by the bore closing plugs 382, 384 and 386, which are provided with reduced axially extending protuberances 388, 390 and 392, respectively, that form abutments engaging the ends of the plungers 334, 336 and 338 when in their extreme position to the right.

The bore 340 of the pressure valve 266 has at one end, as best seen in Figure 18, the inlet port or chamber 394 which is connected by a lateral passage 396, closed at its outer end by the plug 398, to a longitudinal passage 400, closed at its outer end by the plug 402. The passage 400 is connected by a passage 404 (Figs. 14, 15 and 18), which is closed at its outer end by a plug 406, to the chamber 292 of the bore 278 of the main valve 264. The passages 396, 400 and 404 are schematically indicated in Figure 22.

The valve bore 340 also has a discharge port or chamber 408 (Fig. 18), from which the fluid is discharged through an open passage 410 directly into the reservoir.

The valve bore 342 of the pressure valve 268 has an inlet port or chamber 412 (Fig. 20) connected by a lateral passage 414 and a longitudinal passage 416 to a transverse passage 418. The openings which are drilled in the housing 262 to form the passages 414 and 416, are closed by the plugs 420 and 422, respectively. The passage 418 is in communication with a chamber of the bore of the timing valve 274 (Figs. 14 and 22). The valve bore 342 also has a discharge port or chamber 424 from which the fluid is discharged through an open passage 426 (Fig. 14) to the reservoir.

The bore 344 of the pressure valve 270 has an inlet port or chamber 428 (Fig. 19) connected by a lateral passage 430, and a longitudinal passage 432 to a transverse passage 434. The passage 434 connects with a chamber of the bore of the timing valve 274 (Figs. 14 and 22). The openings which are drilled in the housing to form the passages 430 and 432 are closed by the plugs 436 and 438, respectively. The valve bore 344 also has a discharge port or chamber 440 from which the fluid is discharged through an open passage 442 (Figs. 14 and 19) to the reservoir.

The timing valve 272 comprises a valve body or plunger 443 (Fig. 22) slidable in a valve bore 444, and an adjusting rod or stem 446. The valve body 443 is formed to provide a valve head 448 and a hollow skirt 450, the skirt being provided with a circumferential valve groove 452. A coil spring 454, which extends into the hollow skirt 450, is interposed between the head 448 of the valve and a cylindrical block 456 secured in the bore against longitudinal movement, as by a pin 458.

The adjusting rod or stem 446 is provided with a reduced portion 460 which is threaded through a portion of its length as at 462 for reception in the internally threaded part 464 of the block 456. A collar 466 pinned to the reduced rod portion 460 is adapted to engage the inner edge of the block 456 and limit the outward adjustment of the adjusting rod 446. The inward adjustment of the rod 446 is limited by the engagement of the free end of the reduced portion 460 with the valve head 448.

Outward movement of the valve body 443 is limited by the engagement of the reduced projecting portion 468 of the valve with the plug 470 that closes one end of the valve bore 444. Leakage of fluid along and around the rod 446 is prevented by the seal 472, which may be of any desired structure.

The valve bore 444 has longitudinally spaced, enlarged portions or annular grooves forming inlet ports or chambers 474 and 476 (Figs. 17 and 22), and an outlet port or chamber 478. The inlet port 474 is connected by the lateral passage 480 to the passage 300 and the port 302 to which the conduit 260 from the plunger pump 116 is connected.

The port or chamber 476 is connected by the intersecting extension 482 (Fig. 14) of the passage 404 and the passages 400 and 396 to the inlet port 394 of the valve pressure 266, and by the passages 404, 294 and 296 to the conduit 194 from the gear or feed pump.

The outlet port 478 is connected by a passage 484, Figs. 17 and 22, to an inlet passage of the timing valve 274. The opening which is drilled in the housing to form the passage 484 is closed by a plug 486.

The timing valve 274 comprises a valve body or plunger 488 mounted in a bore 490. The valve plunger comprises a head 492 and a skirt 494. The head 492 is provided with a reduced central protuberance 496 adapted to engage the plug 498 closing one end of the bore 490 and thereby limit the inward movement of the valve plunger. The head and skirt of the plunger are provided with longitudinally spaced annular grooves forming the valve passages 500 and 502. A plug 504 having a hollow skirt 506 closes the other end of the valve bore 490. A coil spring 508 which extends within the skirt 494 of the valve plunger 488 and the skirt 506 of the plug 504 urges the valve plunger inward to the position shown in Figure 22. The valve bore 490 has longitudinally spaced enlarged portions or annular grooves forming inlet ports or chambers 510 and 512 and outlet ports or chambers 514 and 516.

The inlet port 510 is connected by a lateral passage 518 to the inlet port or chamber 474 of the timing valve 272, Fig. 17. The opening which forms the passage 518 and the passage 520 that connects the port 474 to the passage 480 is closed at its lower end by a plug 522. The port 512 is in communication with the passage 484.

The outlet port or chamber 514 is in communication with the lateral passage 418 from which the fluid is conducted through the passages 416 and 414, Fig. 20, to the inlet port or chamber 412 of the pressure valve 268. The outlet port or chamber 516 is similarly in communication with the passage 434, Fig. 19, from which the fluid is conveyed through the passages 432 and 430 to the inlet port or chamber 428 of the pressure valve 270.

Open passages 524, 526, 528, 530 and 532 (Figs. 14, 16, 18, 19 and 22) extend into the bores of the valves 266, 272, 270, 268 and 274, respectively, and provide breather-drains which prevent the valve plungers from binding and permit any fluid that may leak past the plungers to drain from the chambers behind the plungers into the reservoir. Pins 534, 536 and 538 extend into the threaded portions 364, 366 and 368 of the valve bores 340, 342 and 344 of the valves 266, 268 and 270 respectively, to provide abutments limiting the inward adjustment of the rods 352, 354 and 356 respectively. This limiting of the adjusting movement of these rods prevents the screws from being adjusted far enough to become bound against the inner defining shoulders of the threaded portions 364, 366 and 368, and these abutment means also prevent the valve springs from being overtensioned, which would cause the valve to be locked against operation and would cause warping of the springs.

The valve bore 490 of the valve 274 is in communication, in advance of the discharge port 514, with an open passage 540 through which the fluid from the plunger or metering pump is discharged into the reservoir after the valve plunger 488 has completed its outward movement, i. e., its movement to the left in Fig. 22.

The operation of the hone expander unit is as follows: Upon shifting of the master or main control valve 264 to the right in Fig. 22, the portion 312 of the valve body 276 closes the port 282 and establishes communication between the chambers 280 and 292 of the valve bore 278. Fluid is therefor fed from the reservoir 120 (as diagrammatically shown in Fig. 24), through the port 190 into the gear or feed pump 114, from which it is fed through the conduit 194 to the passages 296 and 294 (schematically shown in Fig. 22), and to the chamber 292. From the chamber 292 the fluid passes into the chamber 280, and by way of the passages 284 to 286 and the conduit 290 by which it is conveyed to the port 64 of the fluid pressure hone expanding actuator 60 (as shown in Fig. 24). The piston 66 of this actuator 60 now moves to the right as viwed in Fig. 1 and causes an expansion of the abrasive sticks 72 into contact with the surface to be honed.

At the same time that the chambers 280 and 292 are connected together, the shoulder 318 of the valve body 276 passes to the right of the chamber or groove 298, blocking fluid flow through the passage 300. The fluid is accordingly now forced to the inlet port 474 of the timing valve 272 by the plunger or metering pump 116. The metering pump receives its supply of fluid from the feed pump 114 as previously described, namely from the fluid trapped between the intermeshing teeth of the gears of the feed pump through the pipe 184. The pressure in this pipe 184 is limited by the pressure relief valve 177 which returns the fluid to the reservoir 120 if the pressure in the pipe becomes excessive. The fluid under pressure is delivered as shown in Fig. 24 from the metering pump 116 through the check valve 214 and the pipe 260, and normally through the passage 300 (Fig. 22) by which the fluid is conveyed to the port or chamber 298. Communication between the chamber 298 and the radial port 324 of the valve body 276 having been cut off, the fluid is by-passed through the passage 480 to the inlet port 474 of the timing valve 272 and by the passage 518 to the inlet port 510 of the timing valve 274.

The pressure now builds up in the chambers 474 and 510. The plunger 443 is thereby moved outward or to the left in Fig. 24 against the urge of the spring 454. The spring 508 is considerably stiffer than the spring 454, so that the plunger 488 does not move at this time. The rate at which the plunger 443 moves is determined by the rate of delivery of the metering pump 116, which is, in turn, determined by means of the adjusting screw 258 and the slide 246, as previously described. After a slight motion of the plunger 443, the groove 452 establishes a connection between the grooves 476 and 478. Fluid delivered by the feed pump 114 is therefore conveyed from the chamber 292 of the master valve 264 through the passages 404 and 482, the port 476, the groove 452, the port 478, the passage 484, the port 512 of the valve 274, the groove 502, the port 516, and the passages 434, 432, and 430, to the pressure control valve 270. At the fluid pressure for which the valve 270 is set, the plunger 338 (Fig. 22) will be moved outwardly to the left until the flat portion 350 connects the inlet port 428 to the outlet port 440 from which the fluid is returned to the reservoir through the passage 442.

The plunger 443 continues to move until it is stopped by the reduced portion 460 of the adjusting rod 446. The distance the plunger or valve has to move, and hence the time of its motion, is determined by adjustment of the screw 446.

The plunger valve 443 stops in its outward position with the ports 476 and 478 still connected by the groove 452. When the plunger valve 443 has been positively stopped by the adjusting screw 446, the pressure in the chamber 510 rises sufficiently to move the plunger valve 488 against the urge of the spring 508. A slight motion of the plunger 488 breaks the connection between the ports 512 and 516. This blocks off the flow of fluid from the feed pump to the pressure control valve 270. The pressure of the fluid in the chamber 292 of the master control valve, and hence the pressure of the fluid in the hone expanding actuator 60 now builds up to a value determined by the setting of the pressure control valve 266. At the set pressure of valve 266, the valve or plunger 334 (Fig. 22) moves outward to connect the intake port 394 to the outlet port 408 by which the fluid is discharged to the reservoir through the passage 410. As schematically indicated in Fig. 24, the fluid passes to the valve 266 through the passages 400 and 404 from the chamber 292. Pressure determined by the valve 266 exists in the chamber 292 until the groove 500 of the plunger 488 connects the inlet port 512 to the outlet port 514. The time required in this phase of the pressure cycle is determined by the rate of delivery of the metering pump 116 and the distance of travel required by the plunger 488 to connect the grooves 512 and 514. Since this distance of travel is constant, the time is determined solely by the adjusted rate of delivery of the metering pump. When port 512 is connected to port 514, fluid communication is established from the chamber 292 through passages 404 and 482, port 476, the groove 452, the port 478, passage 484, port 512, groove 500, port 514, and passages 418, 416 and 414 to inlet port 412 of pressure control valve 268. The pressure in the chamber 292, and hence the pressure of the fluid supplied to the hone expanding actuator 60 is now determined by the setting of this pressure control valve 268. The plunger 336 of the valve 268, at the preset pressure moves outwardly and connects the inlet port 412 to the outlet port 424, by which the fluid is discharged through the passage 426 and back into the reservoir. This pressure will exist until the main control valve 264 is returned to its idle position shown in Fig. 22. When the valve plunger 488 of timing valve 274 has completed its outward movement, the head of the valve will have passed to the left of the passage 540, and therefore the fluid delivered by the metering pump to the inlet port 510 of the valve 274 will be returned to the reservoir through the passage 540. It will, therefore, be seen that the passage 540 prevents the building up of an excessive pressure when the valve plunger has completed its outward movement and abuts the inner edge of the plug 504.

When the master control valve 264 has been operated to return its valve plunger 276 to the idle position, as shown in Fig. 22, the chamber 280 is immediately connected into communication with the reservoir through the port 282, and, simultaneously cut off from the chamber 292. Hence the fluid pressure in the cylinder of the hone expanding actuator 60 suddenly drops to substantially zero, and the springs 84 and 102 quickly act to collapse the abrasive honing sticks. At the instant that the chamber 280 is open to the reservoir, the port or chamber 298 is also connected to the reservoir through the radial passage 324 and the axial passage 322 of valve plunger 276. Since the pressure in the port 298 therefore suddenly drops to substantially zero, the pressure in the inlet ports 474 and 510 of the timing valves 272 and 274 also drops to zero and the plungers 443 and 488 of these valves snap back to the normal idle position shown in Fig. 22. The plunger or metering pump 116 therefore when the valve 264 is in idle position delivers at substantially no pressure but the gear or feed pump 114 delivers fluid at the pressure set by the adjusting screw 352 of the pressure valve 266, for the fluid from the gear pump is, when the master control valve rests in its idle position, delivered back to the reservoir from the chamber 292 through the passages 404 and 400 to the inlet port 394 of the valve 266, and from this inlet port by the flat part or groove 346 of the valve plunger 334 to the outlet port 408 from which the fluid is discharged through the passage 410 into the reservoir.

The pressure cycle just described in detail will now be summarized. The pressures referred to are at all times indicated by a gauge such as shown at 542 (Fig. 24) connected to the pipe 290.

The rod 326 of the master control valve 264 is pushed inward. The high pressure at which the feed pump 114 has been pumping the fluid through the valve 266 is applied to the hone expanding actuator 60 and this high pressure therefore effects a sudden rapid movement of the rod 96 (Fig. 1) to the right thereby expanding the abrasive honing sticks. This high pressure is maintained only for the briefest interval and ceases practically at the very instant that the abrasive sticks engage the work surface. This brief interval in application of the high pressure is determined by the time that it takes for the valve plunger 443 of the timing valve 272 to move to the left (Fig. 24) sufficiently to connect the port 476 to the port 478. As soon as this connection is made, the pressure drops to an intermediate value predetermined by the presetting of the pressure control valve 270. This pressure is such that the abrasive sticks are urged against the work surface with a force sufficient to remove the small particles or "fuzz" left projecting from the work surface by the boring tool. The time of application of this pressure is determined by the presetting of the adjusting rod 446 of the timing valve 272, for when the valve plunger 443 has been stopped, the plunger 488 of the valve 274 immediately begins to move and almost immediately breaks the connection to the pressure control valve 270. At the same time that the valve 270 was connected to the feed pump 114, the plunger 334 of the high pressure control valve 266 moved to the right to its idle position shown in Fig. 22 as the pressure in the inlet port 394 dropped.

When the valve 270 is now disconnected from the feed pump, as the valve plunger 488 of the timing valve 274 begins to shift, the pressure again builds up to that determined by the high pressure control valve 266. The pressure by which the abrasive sticks are now expanded against the work surface is therefore high and during the application of this pressure, the major portion of the honing operation is performed. This high pressure is applied for a time determined by the time required for the plunger 488 of the timing valve 274 to complete its fixed travel between the plug 498 and the plug 504.

Finally, the pressure drops to a value determined by the low pressure control valve 268. The abrasive honing sticks are therefore urged against the work with a relatively low pressure engagement so that these sticks perform a final smoothing operation upon the work surface. The pressure remains at this low value until the rod 326 of the master control valve 264 is pulled outward to cause, as previously described, an instantaneous collapsing of the honing sticks.

It should be noted that the time interval determined by the plunger 488 of the timing valve 274 is adjustable only by adjustment of the delivery of the metering pump 116 while the time interval determined by the plunger 443 of the timing valve 272 is effected by adjustment of this pump delivery and also by adjustment of the rod 446. Consequently, the travel time of the plunger 488 should be adjusted first by adjusting the rod 258 (Fig. 4) to adjust the delivery of the pump 116, and then the rod 446 (Fig. 22) should be adjusted to obtain the desired travel for the plunger 443. The adjusting rods 352, 354 and 356 of the pressure control valves 266, 268 and 270 are independently adjustable to obtain the desired tool pressures during the successive time intervals.

In some cases it is desirable to provide means for automatically timing the overall pressure cycle and automatically terminating the pressure operation of the tool. This may readily be accomplished by substituting for the timing valve 274 (Fig. 22) the somewhat modified timing valve 544 (Fig. 21) which effects automotive electric operation of the main valve 264. As shown in this figure the valve plunger 488 has an annular groove 546 corresponding to the valve groove 500 (Fig. 22), but of greater axial length, and an annular groove or valve passage 548 similar to, but of greater axial length than the valve passage 502. The annular groove or outlet port 550 corresponding to the port 516 (Fig. 22) is spaced somewhat further to the left from the port 512. A plug 552 which closes the outer end of the bore 490 is centrally bored to receive a slide rod 554 and is also apertured to receive a seal 556 which prevents leakage of fluid about the rod 554. A coil spring 558, interposed between the plug 552 and a collar 560 pinned to the rod 554 normally urges the rod inward or to the right, but permits its outward movement under the pressure of the fluid when the rod is engaged by the plunger 488. An adjustable screw 562 is adjustably carried by the lower arm of a lever 564 which fulcrums on a bracket 566 secured to the housing 262. The screw is adapted to be engaged and operated by the rod 554 so as to move the lever in a clockwise direction as seen in Figure 21. The lever 564 is adapted to engage and operate a switch 568 that controls the energization of a solenoid actuating the rod 326 of the master control valve 264 so that the valve will be moved to its idle position upon operation of the switch 568. The longer valve passage 546 permits the ports 512 and 514 to be connected together before the plunger 488 reaches the limit of its outward movement and for a sufficient time to cover the maximum time requirements in the operation of the honing tool at the low pressure determined by the valve 268. The time of application of this low pressure, and hence the time period of the final smoothing operation, is determined by the adjustment of the screw 562 and the rate of fluid delivery of the metering pump 116. When the desired time has elapsed, the plunger 488 engages the rod 554, shifts this rod outward into engagement with the screw 562, and the lever 564 thereupon operates the switch 568 so that the master control valve is shifted into idle position terminating the pressure cycle and simultaneously terminating the honing operation.

In respect to the broad concept of pressure relief valves automatically varying fluid pressures applied to a fluid actuator, the present application is a continuation-in-part of my earlier, co-pending application, Serial No. 391,130, filed September 9, 1929. The present application, since it contains additional subject matter, is a continuation-in-part of said earlier application Serial No. 391,130.

Hydraulic system for honing

Reference is now made to the fluid circuit diagram of Figure 1, employed to effect the actuation of the fluid actuator 8. Actuation in connection with honing operations will first be described.

The purpose of the control valve 10 is to control the operative connection between the gear or feed pump 18 and the fluid actuator or motor 8. The feed pump 18 is a variable delivery gear pump adjustable by means of the adjusting mechanism 32 and is of the structure shown in my Patent 1,912,737. It may be adjusted to deliver fluid at relatively large volume, and thus constitutes a feed pump adjustable, as desired, to propel the actuator 8 at traverse or relatively rapid feeding rates.

The control valve 10, which controls the direction of travel of the actuator, as propelled by the pump 18, includes a suitable casing 570 and a sliding valve member or plunger 572. When the plunger 572 is in its central or neutral position as shown in Figure 1, fluid from the outlet port of the feed pump 18 is directed through conduits or pipes 574 and 576 into the annular port 578 of the valve 10. The valve passage 580 connects the port 578 to the ports 582 and 584 and to a radial passage 586 which is connected by an axial passage 588 to the end chambers 590 and 592 interconnected by passage 593. The radial passage 586 terminates in unrelieved cylindrical surface portions of the plunger 572. From the interconnected end chambers 590 and 592 the received fluid passes through the conduit 594 to the adjustable pressure determining orifice or restriction 26 and back into a suitable fluid reservoir disposed within the housing 596. Due to the orifice 26, a pressure exists in the port 578. This pressure is applied by the pipes 598 and 600 to the ports 602 and 604, respectively, controlled by the plungers 606 and 608 of the pilot control valve 12. The valve 12 is employed in controlling the shifting of the central valve 10, as will presently appear, the valve 12 thus constituting a pilot valve for the control valve 10.

If the valve plunger 572 is moved to the extreme left position, the port 578 is connected to a port 610 and a port 612 is connected to the end chamber 592. The radial bore 586 is now blocked by the wall of the valve bore against communication with the port 578. The fluid is now directed from the outlet of the feed pump 18 through the conduits 574 and 576, the ports 578 and 610 of valve 10 and conduits 614 and 616 into the rear chamber 618 of the fluid motor 8. To limit the pressure that is now exerted against the piston 620 of the motor 8, the safety relief valve 22 is connected to the conduit 574.

The piston rod 40 of the fluid motor 8 now moves to the left at a rate corresponding to the delivery of the pump 18 to cause a similar motion of the headstock or carriage 2 and a consequent similar movement of the work tool. As the piston 620 moves to the left, it forces fluid out of the chamber 622 and through conduits 624 and 626 into the port 612 of the valve 10. From the port 612 the fluid passes into the end chamber 592 and passes therefrom through the conduit 594 and the pressure orifice 26 back into the reservoir.

If the valve plunger 572 of the valve 10 is moved to the right extremity of its movement, the port 578 is connected to the port 612 and the port 610 is connected to the end chamber 590. The radial passage 586 is again blocked from communication with the port 578 by the wall of the valve bore. Fluid from the feed pump 18 now passes through the conduits 574 and 576, the port 578, the port 612, the conduits 626 and 624, into the motor chamber 622. The piston 620 is thereby forced to the right to draw the headstock or carriage 2 to the right and advance the tool into the work. As the piston 620 moves to the right, fluid is expelled from the chamber 618, through the conduits 616 and 614, the port 610, to the end chamber 590 and from the end chamber 590 through the passage 593 to the end chamber 592 from which latter chamber the fluid is expelled through the conduit 594 and the pressure orifice 26 back into the reservoir.

The valve 12 and suitable carriage operated control dogs control the valve 10, which in turn controls the reversal of the fluid actuator or motor 8, and hence the reversal of the headstock or tool carriage 2. When the valve plunger 572 of value 10 stands at the right end of its travel so that the piston 620 is moving toward the right, the plunger 608 of the valve 12, if depressed, connects the conduit 600 to a conduit 628. However, no fluid flows through the conduit 600 at this time because the port 682 is blocked by the valve plunger 572. If the plunger 608 is held depressed while the valve plunger 572 is moved back toward its neutral position, the fluid under pressure in the port 578 will be admitted into the conduit 600 as the valve passage 580 connects the ports 578 and 582. The fluid will now flow through the conduit 600, the bore of the valve plunger 608 and the conduit 628 into a chamber 630 to the right of a piston 632 forming part of the valve 10. The piston 632 will therefore be forced to the left and carry the valve plunger 572 past neutral position into its extreme left position in which position, as previously described, fluid is directed into the chamber 618 of the motor 8 to cause it to move to the left. The movement of the valve plunger 572 to the left forces a piston 634 to the left, and this piston expels fluid from a chamber 636 and through a conduit 638 into a radial port 640 in the valve plunger 606 and through an axial passage 642 in this valve plunger into a conduit 644 which conveys the fluid back to the reservoir in the casing 596.

In a similar manner if the plunger 606 of the valve 12 is depressed or held depressed while the valve plunger 572 of the valve 10 is being moved from the left extreme position to its neutral position, fluid will flow from the port 578, the valve passage 580, the port 584, the pipe 598, the port 602, the bore of the valve plunger 606 and the conduit 638 into the chamber 636 at the left of the piston 634. The consequent movement of the piston 634 to the right will cause the valve plunger 572 to pass through its neutral position and into its extreme right position. The fluid expelled from the chamber 630 by the movement of the piston 632 to the right flows through the conduit 628, the radial port 646 and an axial passage 648 in the valve plunger 608, to a pipe 650 connected to the pipe 644 and by the latter discharged back into the reservoir in the casing 596.

From the above description it will be evident that the plunger 572 of the valve 10 may be placed in either of its extreme positions and will remain stationary in either of these positions even though the plungers of the valve 12 be operated. However, if the plunger 606 or 608 of the valve 12 is depressed while the valve plunger 572 is in its neutral postion or moving to neutral position, then the valve plunger 572 will not remain nor stop in neutral position, but will move or continue to move to an extreme position. It should be specifically noted that the plungers of the valve 12 do not shift the plunger 572 of the valve 10 from one extreme position to the other, but that they simply predetermine whether or not the valve plunger 572 shall remain in neutral when shifted to neutral position.

In order to automatically control the valves 10 and 12, a slide rod or carriage 649 is operatively connected to the headstock or carriage 2 by the part 38. The rod 649 carries dogs or cams 651 and 652 shiftably mounted to extend therefrom in a position to actuate the operating rod 654 of the plunger 606, the operating rod 656 of the plunger 608, and the operating lever 658 for the valve plunger 572. Assume that valve plunger 572 is in its leftward position, and that the carriage 2 is moving to the left. The cam 651 depresses the plunger 606 of the valve 12 by actuating the rod 654 just before the reciprocating carriage or headstock 2 carries the honing tool to the left end of the honing region of reciprocation. Then the cam 651 moves the valve plunger 572 of the valve 10 to neutral position by operating the lever 658 precisely at the end of the honing stroke and hence the reversal of the honing tool occurs exactly at the end of its desired feeding movement to the left. In a similar manner, the cam 652 by operating the plunger 608 through the rod 656 and then actuating the lever 658, causes a reversal of movement of the honing tool precisely at the end of its feeding stroke to the right. The dogs 651 and 652 are preferably mounted for adjustment longitudinally of the carriage 649 so as to determine the desired range of reciprocation imparted to the tool and the limits of movement at which the tool will be reversed. By automatically presetting a reversing control before the tool reaches the end of its feeding movement the tool may be fed up to a shoulder or edge of the work and stopped, the preset reversing control then causing the tool direction of movement to be reversed without time lag or additional manipulation. During reciprocation of the honing tool, the pressure of the honing sticks against the work surfaces may be automatically controlled by the expander unit 6, as previously described.

*Hydraulic system for boring*

The purpose of the control valve 16 (Fig. 1) is to control the operative connection of the feed pump 20 to the fluid actuator or motor 8, to effect actuation thereby. The valve 16 includes a suitable casing 660 and a slide valve or plunger 662. When the plunger 662 is in the nonfeeding position shown in Fig. 1, fluid pressure from the gear or feed pump 18 is applied to the conduit 574, the conduit 664, valve passage 666 and conduit 668 to the upper end of a chamber 670 of the fluid actuator 30. This pressure holds the actuator piston 672 to the lower end of its stroke. With the piston at the lower end of the stroke, the gear segment 674, which meshes with rack teeth formed on the piston rod 676, is positioned at one extreme limit of its motion, and the feed pump displacement control shaft 678 to which the segment is secured, is adjusted to hold the delivery of the feed pump 20 to zero. The feed pump 20 is a variable displacement plunger pump, of lower volumetric capacity than the gear pump 18, and may be of a construction such as described in my copending application Serial No. 71,754 filed March 30, 1936, now issued as Patent No. 2,266,829, dated December 23, 1941, wherein a shaft such as the shaft 678 when angularly adjusted, determines the rate of delivery of the pump.

It should be noted that the pressure which is exerted on actuator piston 672 to hold it at the lower end of its stroke, as just described, has a value determined by the adjustable pressure determining orifice or restriction 26 for the control valve 10 is at this time, when the feed pump 20 is to be used for propelling the actuator, adjusted to its neutral position, and the fluid from the feed pump 18 is circulating through the feed pipe 574 at the pressure determined by the device 26, as previously described.

When the valve plunger 662 of the valve 16 is in the non-feeding position shown in Fig. 1, the feed pump 20 is further rendered inoperative by the fact that the conduit 680 supplying fluid to the inlet of this pump is blocked by the part 682 of the plunger 662.

If it is desired to pull-feed the boring bar 52 (Fig. 23) by the plunger pump 20, the valve plunger 662 (Fig. 1) is depressed to the fullest extent. This connects the conduit 664 to a conduit 684 through the valve passage 666, and fluid delivered by the feed pump 18 is therefore forced from the conduit 574 through the conduit 664, the valve passage 666 and the conduit 684 into the chamber 686 of the actuator 30. This fluid forces the piston 672 to move outward until the piston rod engages the adjustable stop or abutment formed by the adjustable cam 688. This movement of the actuator piston 672 fixes the delivery of the feed pump 20 at a value determined by a previous manual setting of the cam abutment 688. The fluid displaced from the chamber 670 of the actuator 30 is discharged through the conduit 668, the radial passage 690, and axial passage 692 of the plunger 662 into the chamber 694 of the valve casing 660. From the chamber 694 fluid is drained by the pipe 696 into the reservoir in casing 596.

Fluid is now fed by the feed pump 20 through the conduit 698, the passage 700 of valve plunger 702 of valve 14 to conduit 704. The valve plunger 702 is slidably mounted in a suitable casing 706, and as will be presently described, constitutes a reversing control valve for the system. From the conduit 704 fluid passes through the conduit 616 into the chamber 618 of the fluid motor 8. To pull-feed the boring bar, the cam abutment 688 will be adjusted to cause relatively slow fluid delivery by the pump 20. Therefore, the piston 620 of the fluid motor 8 now moves slowly to the left to pull-feed the boring bar to the left at a relatively slow rate.

The force exerted by the fluid against the piston 620 is limited by the safety relief valve 24. It should be noted, as previously stated, that the control valve 10 is at this time in its neutral position, so that the conduit 614 is blocked by the plunger 572.

Fluid forced from the chamber 622 by the leftward movement of the piston 620 is delivered through the conduit 624, the conduit 708, the end chamber 710 of the valve 14, the passage 712, the end chamber 714, the conduit 716, the valve passage 718 of the plunger 662, and the conduit 680 through filter 28 to the intake of the feed pump 20. It will be seen that the fluid circuit of the feed pump 20 is closed upon itself, and this closed circuit assures that the piston 620 of the fluid motor 8 will be fed at a rate precisely determined by the rate of delivery of the feed pump 20. If, because of slight leakage in the system, or for other cause, the volume of fluid discharged from the chamber 622 of the fluid motor 8 does not precisely equal that pumped into the chamber 618 of the motor, the difference is supplied to the pump through the conduit 680 by way of a small passage 720 in casing 660 of the valve 16. When the plunger 662 of the valve 16 is depressed, this passage 720 is connected to the supply conduit 664 from the feed pump 18 through the valve passage 666. The fluid in the pipe 664 is directed to the orifice or restriction 26, as previously described, and, therefore, any excess amount of fluid delivered through the conduit 716 will be passed through the passage 720 to the conduit 664, through the conduit 576, port 578 of valve 10, the radial and axial passages 586 and 588, the end chamber 592, and the conduit 594 through the orifice or restriction 26 into the reservoir in casing 596. The plunger 662 of the valve 16 may be moved from one position to the other by any suitable manual or automatic means as convenient for the particular installation.

For boring operation on certain kinds of work it is necessary or desirable to provide means for feeding the boring tool in either direction. In the system shown in Figure 1, this is accomplished by the feed reversing control valve 14. When by operation of the operating shaft 722 of the valve 14 the lever 724 shifts the valve plunger 702 to its extreme left position, as shown in Figure 1, conduit 698 is connected to the conduit 704 and the conduit 708 is connected to the conduit 716, as previously described, to direct fluid supplied by the pump 20 to the chamber 618 of the fluid motor 8 so that the boring tool is moved to the left.

If the shaft 722 is operated to swing the lever 724 in a counter-clockwise direction, the valve plunger 702 is shifted to its extreme right position connecting the conduit 698 to the conduit 708, and the conduit 704 to the conduit 716. Accordingly, fluid supplied by the pump 20 is delivered through the conduit 698, the valve passage 700, the conduit 708, and the conduit 624 to the chamber 622 of the fluid motor 8. The piston 620 is therefore moved to the right to cause a similar movement of the boring tool to the right. Fluid forced from the chamber 618 by the piston 620 is delivered through the conduit 616, the conduit 704, the chamber 714, the conduit 716, the valve passage 718, and the conduit 680 through the filter 28 to the inlet side of the feed pump 20.

If it is desired to effect a relatively rapid traverse of the headstock or carriage 2 and the tool when using the machine for boring, the valve 10 may be operated by a manual actuator (not shown) connected to the control shaft 726 of the valve 10 (or by manual operation of the plunger 606 or 608 of valve 12). For example, if it is desired to effect a rapid traverse of the carriage 2, the shaft 726 will be operated in a direction to move the plunger 572 to its right extreme position. This, as previously described, connects the feed pump 18 for the delivery of fluid to the chamber 622 of the fluid motor 8 and connects the chamber 618 of the fluid motor to the conduit 594 for discharge of the fluid back into the reservoir. Since the rate at which fluid is supplied by the gear feed pump 18 is substantially greater than the rate of fluid fed by the plunger feed pump 20, this connection of the feed pump 18 to the fluid motor 8 will effect a rapid traverse movement of the headstock or carriage 2. Similarly, rapid traverse of the carriage 2 to the left will be effected by rotating the shaft 726 in a direction to move the valve plunger 722 to its extreme left position, by which the feed pump 18 is connected to the chamber 618 of the fluid motor 8 and the chamber 622 of this motor is connected to the conduit 594 for discharging fluid back into the reservoir.

*Electrical control system and machine operation*

The electrical system schematically shown in Fig. 25 includes a motor 42 which, as shown in Fig. 1, rotates the tool receiving spindle 48; the motor 126 which drives the pump 112 of the hone expander unit; and a motor 728 which drives the feed pumps 18 and 20 (Fig. 1). These motors which may be of any suitable type are preferably of the conventional three-phase alternating current type, the motor 728 being preferably a two-speed constant torque, single-winding or "consequent pole" type.

The motor 126 is controlled by a conventional magnetic full voltage non-reversing starter 730; the motor 42 is controlled by a conventional magnetic full voltage reversing starter 732; and the motor 728 is controlled by a two-speed magnetic full voltage starter 734.

The starters are provided with conventional thermal overload cut-outs, of which the heating elements are designated by the common numeral 736 and the control or cut-out switches by the common numeral 738. The switches 738 are connected in series so that an overload on any motor will break the circuit to all of the motors, as will later appear.

The starter 730 additionally includes switches 740 to 746 operated by the common actuating magnet 748. The starter 732 includes in addition the "forward" switches 750, 752 and 754; the "reverse" switches 756, 758 and 760; the switches 762 and 764; and the switches 766 and 768 controlling the actuating magnets 770 and 772.

It will be evident to those skilled in the art that energization of the magnet 770 closes the switches 750, 752 and 756 to connect the motor leads 774, 776 and 778 to the supply lines L—1, L—2 and L—3, in the order named, through the conductors 780, 782 and 784 and that energization of the magnet 772 will close the switches 756, 758 and 760 to connect the motor leads 774, 776 and 778 to the supply lines L—3, L—2, and L—1, in the order named, through the conductors 780, 782 and 784. Hence, upon energization of the magnet 770, the motor will be connected for "forward" rotation, while upon energization of the magnet 772, the motor will be connected for "reverse" rotation.

Upon energization of the magnet 770, the normally closed switch 766 will be opened to break the circuit to the reversing magnet 772 to prevent energization of the motor for "reverse" rotation until the forward magnet 770 is de-energized, and, similarly, the magnet 772, when energized, causes the normally closed switch 768 to be opened, thereby breaking the circuit to the forward magnet 770 and preventing energization of the motor for "forward" rotation until the reversing magnet 772 has been de-energized.

The two-speed starter 734 includes the "high speed" switches 786, 788, 790 and 792, and the "low speed" switches 794, 796 and 798. The starter 734 also includes a switch 800 and the switches 802 and 804 which control the actuating magnets 806 and 808 of the starter.

Energization of the magnet 806 causes a closing of the switches 786 to 790 to connect the motor leads 810, 812 and 814 to the supply lines L—1, L—2 and L—3, in the order named, through the conductors 816, 818 and 820. The switch 792 is simultaneously closed to connect the motor leads 822, 824 and 826 together through the conductors 828, 830 and 832. Simultaneously, the normally closed switch 802 is opened to prevent energization of the "low speed" actuating magnet 808 until the "high speed" actuating magnet 806 is de-energized. It will be evident to those skilled in the art that the motor 728 when thus connected will rotate at its highest speed.

Upon energization of the "low speed" actuating magnet 808 the switches 794, 796 and 798 will be closed to connect the motor leads 822, 824 and 826 to the supply lines L—1, L—2 and L—3, in the order named, through the conductors 816, 818 and 820. At the same time the normally closed switch 804 will be opened to prevent energization of the "high speed" actuating magnet 806 until the "low speed" actuating magnet 808 is de-energized. With the motor circuit completed as thus described, the motor 728 will rotate at its low speed. Thus the energizing of magnet 806 results in high speed rotation of the motor 728 and energizing of the magnet 808 results in low speed rotation of that motor.

Power for the control circuits is supplied by the lines L—1 and L—3 across which the primary winding 834 of the transformer 836 is connected. The secondary winding 838 supplies power to the control circuit supply lines C—1 and C—2.

To precondition or energize the control circuits when it is desired to put the machine in service, either for a boring or a honing operation, the start button of the switch 840 is operated to close the switch member 842. Closure of the switch member 842 completes the circuit from the supply line C—1 through the actuating magnet 844 of the master control switch 846, the contacts 848, the contacts 850 (normally closed by the switch member 852 of the switch 840), the conductor 854, the overload cut-out switches 738 of the several motors and the conductor 856 to the supply line C—2.

The magnet 844 causes the switch members 858, 860 and 862 of the master control switch 846 to be closed. The switch member 858 completes a holding circuit for the magnet 844 through the conductor 864 in shunt to the contacts 848, and the re-opening of the switch member 842 will not therefore effect de-energization of the magnet 844. The switch members 860 and 862, when closed, connect the supply lines C—1 and C—2 to the control circuit supply conductors 866 and 868, respectively. The switch member 852 is operated by the stop button of the switch 840 and, when open, breaks the circuit to the magnet 844 of the master control switch 846, and the switch members 858, 860 and 862 are thereby moved to open position breaking their respective circuits. Thus the various control devices will all be energized or de-energized in response to the manipulation of the switch 840.

A sustained overload on any one of the motors will cause the associated overload cut-out switch 738 to open, thereby breaking the circuit of the actuating magnet 844 of the master control switch 846. This will result in the opening of the switch members 860 and 862 and the consequent de-energizing of all the control devices including the actuating magnets of the several motor starters. Hence, a sustained overload on any motor will effect de-energization of all the motors.

When it is desired to use the machine for honing operations, the switch 870 is preconditioned or operated to engage the contact 872 and connect the conductor 874 to the conductor 876. The motor 126 of the hone expander unit 6 can now be started by momentarily closing the push button switch 878. This completes the circuit from the conductor 868 through the normally closed switch 880, the switch 878, the conductor 882, the actuating manget 748 of the motor starter 730, and conductor 884 to the supply conductor 866. The motor switches 742, 744 and 746 are thereby closed to start the motor 126. The switch 740 is simultaneously closed to complete a holding circuit for the actuating magnet 748 through the conductor 886 in shunt to the conductor 882 and switch 878. The motor 126 may be stopped by momentarily opening the switch 880, thereby breaking the circuit to the actuator magnet 748.

The next step in the use of the machine for a honing operation is to move the headstock or carriage 2 forward, or to the right, as seen in Figure 1, far enough to enter the collapsed honing tool into the work. To accomplish this, the control valve 10 (Figure 1) is shifted to the forward position, i. e., to the position in which the valve plunger 572 is at its right extreme position to direct the fluid delivered by the feed pump 18 into the chamber 622 of the fluid actuator or motor 8. No fluid is supplied to the motor 8, however, for the motor 728 which drives the feed pump 18, and also the feed pump 20, has not yet been energized.

The push button switch 888 is now operated to "set up" or locate the honing tool. The switch is operated to break the contacts 890 and to close the contacts 892. This completes a circuit from the conductor 868 through the conductor 874, the switch 879, the contact 872, the conductor 876, the conductor 894, the contacts 892 of the switch 888, the conductor 896, the switch 804 of the motor starter 734, the conductor 898, the actuating magnet 806 and the conductor 900 to the supply conductor 866. This energization of the "high speed" actuating magnet 806 causes the motor 728 to rotate at a high speed. The feed pump 18 being now driven, supplies fluid, as previously described, to the fluid motor 8 to cause a rapid traverse of the honing tool toward the work. When the tool approaches the position at which it should be expanded, the switch 888 is released. This breaks the circuit previously described to the actuating magnet 806 and the motor 728 stops. The tool may be "inched" into the exact position for expansion of the honing sticks by successive momentary operations of the switch 888. If the tool is moved too far forward, the valve 10 may be shifted to its other extreme position for movement of the piston 620 of the fluid motor 8 to the left and the "inching" of the tool continued by manipulation of the switch 888.

The tool having been properly located in or relative to the work, and the reversing dogs 651 and 625, Fig. 1, properly positioned, the honing sticks are now to be expanded by means of the expander unit 6. This operation is initiated by closing the switch 902 which completes a circuit from the supply conductor 868 through the conductor 904, the switch 902, the solenoid 906, and the conductor 908 to the supply conductor 866. The solenoid 906 is operatively connected to the operating rod or stem 326 of the main control valve 264 (Fig. 22), and moves the rod inward to cause the expansion of the hone. Any suitable means, such as a return spring, may be used to move the rod 326 outward when the solenoid 906 is de-energized. The switch 902 may be manually operated, or it may be automatically operated through a suitable mechanical connection to a reciprocating part of the machine or to the piston rod of the fluid motor 8. In any case, the switch 902 is closed when the honing tool is to be expanded and is opened when the honing operation has been completed and it is desired to collapse the honing sticks.

When it is desired to time the overall honing cycle, the normally closed switch 568 (Fig. 21) may be interposed in the conductor 904 or the conductor 908. Hence, when the plunger 488 of the timing valve 544 has completed the desired outward movement and opened the switch 568, the solenoid 960 is de-energized and the plunger 326 of the master control valve 264 returned to its idle position.

The motor 42 for rotating the honing tool and the motor 728 for driving the feed pump 18, which, in turn, feeds the fluid motor 8 to cause reciprocation of the honing tool, are set in motion for continuous operation as follows: The push button switch 910 is momentarily operated to break the connection between the contacts 912 and to close the contacts 914. This completes a circuit from the conductor 866 through the conductor 916, the solenoid 918 of a switch 920, the conductor 922, the contacts 914, the conductor 876, the contact 872, switch 870, and conductor 874 to the supply conductor 868. The switch members 924 and 926 of the switch 920 are thereby closed and the switch member 928 of the switch is opened. The switch member 924 completes a holding circuit for the solenoid 918 from supply conductor 866 through conductor 916, solenoid 918, switch member 924, conductor 930, conductor 932, contact 934, switch 936, and conductor 938 to the supply conductor 868. The switch 936, which is operated by a dog attached to a reciprocating part of the machine, is positioned to engage the contact 934 at all times, except when the tool is fully withdrawn, i. e., when the headstock or carriage 2 is in its extreme position to the left beyond the normal reciprocating range of the carriage during a machining operation. Thus, the solenoid actuated switch 920 remains energized after the switch 910 is released and breaks the connection between the contacts 914.

When this switch 910 is released, it makes a connection between the contacts 912 and completes a circuit from the supply conductor 868 through conductor 938, switch 936, contact 934, conductor 932, contacts 912, conductor 940, switch member 926, conductor 942, contacts 890 now closed ("set up" switch 888 having been released to upward position), conductor 896, switch 804 of the starter 734, conductor 898, high speed actuating magnet 806 and the conductor 900 to supply conductor 866. This circuit energizes the magnet 806 and causes the motor 728 to rotate at high speed, as previously described.

At the same time, the switch member 926 completes an energizing circuit for an actuating magnet of the motor 42. This circuit, which branches from the circuit just described, extends from the conductor 942 through the conductor 944, contacts 946 and 948 of switch 950, conductor 952, switch 766 of the motor starter 732, conductor 954, "reverse" actuating magnet 772, and conductor 956 to supply conductor 866. The switch 950 is provided to preselect the desired direction of rotation of the tool rotating motor 42. In the diagram of Fig. 25 this switch is shown in position for "reverse" rotation of the motor 42. If the switch had been positioned to connect the contact 957 to the contact 958, the motor 42 would have been energized for "forward" rotation, for the conductor 944 would then have been connected through the conductor 945, the contacts 957 and 958, the conductor 960, the switch 768 of the motor starter 732, the conductor 962, the "forward" actuating magnet 770 and the conductor 964 to the supply conductor 866.

From the foregoing description it will be clear that the operating and releasing of the push button switch 910 result in causing the motor 728 to rotate at its high speed, and the motor 42 to rotate either in a "forward" or a "reverse" direction as predetermined by the position of the switch 950. The direction of rotation of the motor 42 may, as will be evident, be changed at any time by changing the setting of the switch 950.

The motor 728 drives the feed pump 18 which supplies the fluid to the motor 8 and causes the headstock or tool carriage 2 to reciprocate between limits adjustably preset by the dogs or cams 651 and 652, Fig. 1. The cams or dogs 651 and 652 coact, as previously described, with the actuator 658 of the control valve 10 and the plunger actuating rods 654 and 656 of the control valve 12 to stop the tool in its reciprocation precisely at the desired points, and then to reverse the tool automatically.

The motor 42 rotates the tool. The motor 126 drives the combined gear and plunger pump 112 of the hone expanding unit 6, so that the several work engaging pressures determined by the pressure determining and timing device 124 are applied to the honing sticks for the desired time intervals and in the desired sequence.

When the honing tool has made the desired number of reciprocations, the cams or dogs 651 and 652 may be manually moved out of active relation to the plunger actuating rods 654 and 656, and the headstock or carriage 2 will on the next backward stroke continue beyond the working range of reciprocation and withdraw the honing tool from the work. When the tool is fully withdrawn, the actuator shaft 726 of the control valve 10 may be manually operated to return the plunger 572 to neutral position, or a cam similar to but of a lesser height than the cam 651 may operate the lever 658 to return the valve 10 to its neutral position. A similar cam or dog carried by the carriage 649, or other reciprocating part of the machine, may, when the carriage 2 has moved sufficiently backward to withdraw the tool from the work, move the switch 936 out of engagement with the contact 934 and into engagement with the contact 966.

The operation of the switch 936 out of engagement with the contact 934 breaks the holding circuit of the solenoid 918 of the switch 920. This permits the switch members 924 and 926 to open and the switch member 928 to close. It will be recalled that the circuit energizing the high speed actuating magnet 806 of the motor starter 734 and the circuit for energizing an actuating magnet of the motor starter 732 were completed through the switch member 926. Therefore, the opening of this switch member 926 causes a breaking of the circuits to the motors 728 and 42.

In order to bring the motor 42 quickly to rest, a zero speed or "plugging" switch 968 is provided. This switch, which may be of any well known type, includes contacts 970, 972, 974, and 976, and is driven by the motor 42. When the motor is operating in a "forward" direction, the contacts 970 and 974 are connected, and, when the motor is running in a "reverse" direction, contacts 972 and 976 are connected. When the motor is stationary, no connection is made by the switch 968. Let it be assumed that the motor 42 has been running in a "reverse" direction as the switch 950, positioned as shown in Fig. 25, would require. As previously described, the operation of the switch 936 into engagement with the contact 966 caused the de-energization of the actuating magnet 772 of the motor starter 732, and power was thereby disconnected from the motor 42. However, the motor has a tendency to continue rotating, and therefore the switch 968 continues to maintain a connection between the contacts 972 and 976. A circuit is, therefore, completed from the supply conductor 868 through the conductor 938, switch 936, the contact 966, the conductor 978, the contact 972, the contact 976, the conductor 960, the now closed switch 768 of the motor starter 732, the conductor 962, the "forward" actuating magnet 770, and the conductor 964 to the supply conductor 866. This energization of the magnet 770 causes the motor 42 to be connected for "forward" rotation, and therefore brings the motor quickly to rest. When the motor 42 comes to rest, the switch 968 breaks the connection between the contacts 972 and 976 and thereby opens the energizing circuit of the magnet 770. This prevents the motor from starting to rotate in a "forward" direction.

If the motor 42 had been rotating in a "forward" direction at the time the switch 936 was operated to engage the contact 966, the switch 968 would have been positioned to connect the contacts 970 and 974, and an energizing circuit for the "reverse" actuating magnet 772 would have been completed from the conductor 978 through the contacts 970 and 974, the conductor 952, the now closed switch 766, the conductor 954, the actuating magnet 772 and the conductor 956 to the supply conductor 866. The "plugging" of the motor would then have taken place, as previously described, and the switch 968 would have broken the energizing circuit for the magnet 772 before the motor started to rotate in the "reverse" direction.

When it is desired to use the machine for boring operations, the switch 870 is positioned to engage the contact 980. A circuit is now established from the conductor 868 through the conductor 874, the switch 870, the contact 980, the conductor 982, the switch 802 of the motor starter 734, the conductor 984, the "low speed" actuating magnet 808, and the conductor 986 to the supply conductor 866. This causes energization of the motor 728 for rotation at its low speed.

I have found that the maximum traverse rate desirable for boring operations is less than that suitable for honing operations. By operating the motor 728 at its low speed during boring operations, the rate of delivery of fluid by the feed pump 18 is of course less than its rate of delivery when the motor 728 is driven at its high speed. Hence, the maximum rate at which the headstock or carriage 2 may be traversed during boring operations is less than the rate at which it is traversed during honing operations. Moreover, during boring operations the headstock or carriage 2, and consequently the boring tool may traverse forwardly or backwardly, selectively, at a rate determined by the rate of delivery of the feed pump 20, or, selectively, a a rate determined by the higher rate of delivery of the feed pump 18. Selection of the higher traverse rate, in either direction, may be effected by manual operation of the control valve 10, as previously described.

When the boring tool has been brought into position by fluid motor 8 to begin a cut, the motor 42 should be started to rotate the tool. This is accomplished as follows: A push button switch 988 is momentarily depressed to connect the contacts 990 and 992. A circuit is thereby established from the supply conductor 868 through conductor 938, switch 936 (now engaging the contact 934 because the carriage 2 is away from its fully withdrawn position), the contact 934, the contacts 994 and 996 normally closed by a switch 998; conductor 1000, switch member 928 of switch 920, conductor 1002, now closed switch 800 of the motor starter 734, conductor 1004, contacts 992 and 990, conductor 1006, conductor 942, conductor 944, contacts 946 and 948 (or contacts 957 and 958) of the switch 950, the conductor 952 (or 960), switch 766 (or 768), conductor 954 (or 962), "reverse" actuating magnet 772 (or "forward" actuating magnet 770), and conductor 956 (or 964) to supply conductor 866. Thus the magnet 772 (or 770) is energized in accordance with the presetting of the switch 950 to start the motor 42 rotating in the desired direction. A consequent closing of the switch 764 (or the switch 762) of the motor starter 732 completes a holding circuit for the energized magnet 772 (or 770) by means of a conductor 1008 shunting the switch 988.

After the motor 42 has been started, as just described, the control valve 14 (Fig. 1) is manipulated to position the plunger 702 at one or the other of its extreme positions, and thereby determine the direction in which the fluid motor will be actuated to effect the feeding of the boring tool to the work. The control valve 16 is then operated to cause the fluid supplied by the feed pump 20 to be supplied to the motor 8 to effect a feeding motion of the boring tool. When the cut is completed, the fluid motor 8 may be stopped and then actuated by suitable manipulation of the control valves 10 and 16 to effect a traversing movement of the tool, as previously described. Thus, if the control valve 14 has been preset to cause the feeding of the boring tool to the right in Fig. 1 to make a cut in the work, the valve 16 may be maintained operated on compleion of the cut to effect a slow traverse of the tool to the left, or the valve 10 may be operated to effect a rapid traverse of the tool to the left. Similarly, if the valve 14 has been preset to effect the feeding of the tool to the left in making a cut, the valve 16 may be maintained operated to effect a slow traverse of the tool to the right; or the valve 10 may be operated to effect a rapid traverse of the tool to the right.

The motor 42 may be stopped at any time during a boring operation by momentarily depressing the push button switch 998. The consequent opening of the normally closed contacts 994 and 996 breaks the circuit previously described, by which the magnet 772 (or the magnet 770) of the motor starter 732 was energized, and the closing of normally open contacts 1010 connects the conductor 978 to the conductor 868. The connecting of the conductor 978 to the conductor 868 energizes the contacts of the plugging switch 968 and produces a quick stopping of the motor 42, as previously described.

If the tool is fully withdrawn from the work and the headstock or carriage 2 is returned to its extreme position of movement to the left, as seen in Fig. 1, while the motor 42 is still running, the switch 936 will be operated, as previously described, into engagement with the contact 966, and thereby energize the contacts of the plugging switch 968 through the conductor 978, thereby quickly stopping the motor 42.

It will be seen from the foregoing description that applicant has provided in a material working apparatus a fluid pressure system having a plurality of individually adjustable pressure determining devices rendered effective successively in a preselected sequence and for predetermined adjustable timing periods. The invention has also provided in a honing machine a fluid actuated honing tool, and an expansion control system whereby, during a honing operation, the pressure of the honing tool against the work automatically changes, as required by the character and condition of the work. My invention has also provided a combined honing and boring machine embodying an electro-hydraulic or fluid actuator and control system, including interrelated fluid pressure generating means, fluid pressure control means, and fluid directing means that are adjustable and selectively operable to cause feeding and traversing movements of the working or cutting tool at selective rates best suited to the character of the work to be done, and to cause the tool to engage the material being worked at working pressures best suited to the character of the work, the nature of the material and the changing condition of the material as the working thereof progresses.

Claims to the hone expander pressure control system, as a pressure control system of general purpose, are set forth in a divisional application.

Changes may be made in the form, construction and arrangements of the parts without departing from the spirit and scope of the invention or sacrificing any of its advantages, and the right is hereby reserved to make all such changes as fairly fall within the scope of the following claims.

I claim:

1. In a honing machine, a tool support for a honing tool, a support for a work piece, means for causing relative reciprocation of the tool support and the work piece support, a hone expanding unit supported on the tool support, said unit including a fluid actuator operatively connected to the honing tool to cause expansion of the honing tool, a pump, a fluid circuit connecting the pump to the actuator, a plurality of pressure control valves connectible with said fluid circuit to vary the pressure conditions within the actuator, a second pump, and fluid actuated valve means connected to and receiving fluid from the second pump for controlling the connection of said pressure control valves to said fluid circuit thereby to vary the pressure of engagement of the honing tool with the work piece.

2. In a honing machine, a support for a honing tool, a support for a work piece, means for causing relative reciprocation of the tool support and the work piece support, a hone expanding unit supported on the tool support and including a fluid actuator operatively connected to the honing tool to cause expansion of the honing tool, pumping means, a supply circuit connecting the pumping means to the actuator, pressure control valves associated with said supply circuit and operable to establish predetermined different pressures within the actuator, fluid actuated valve means connected to said pumping means and receiving fluid therefrom for rendering the pressure control valves operable in a predetermined sequence for predetermined time periods thereby to vary the pressure of engagement of the honing tool with the work piece in predetermined steps and for predetermined time periods, and means for adjustably varying the rate of delivery of fluid to said fluid actuated timing valve means whereby to vary the time periods of the several pressure steps.

3. In an abrading machine, an abrading element, means for advancing said element into contact with the surface to be abraded, a fluid actuator for applying pressure to said abrading element, pressure control valves operable selectively to establish different pressures within the actuator selectively to produce different pressures between said element and said surface, fluid actuated valve means for rendering said pressure control valves effective selectively in a predetermined sequence, and means for supplying fluid to said fluid actuated valve means to control the operation thereof.

4. In an abrading machine, an abrading element, means for advancing said element into contact with the surface to be abraded, a fluid actuator for applying pressure to said abrading element, pressure control valves operable selectively to establish different pressures within the actuator selectively to produce different pressures between said element and said surface, fluid actuated valve means for rendering said pressure control valves effective selectively in a predetermined sequence, and means for supplying fluid at a given rate to said fluid actuated valve means to time the effective periods of said pressure control valves.

5. In an abrading machine, an abrading element, means for advancing said element into contact with the surface to be abraded, a fluid actuator for applying pressure to said abrading element, pressure control valves operable to establish different pressures within the actuator to produce different pressures between said element and said surface, fluid actuated valve means for rendering said pressure control valves effective selectively in a predetermined sequence, means for supplying fluid to said fluid actuated valve means at a metered rate to time the effective periods of the pressure control valves, and adjustment means for adjustably controlling the rate of supply of fluid to said fluid actuated valve means to vary the effective periods of the pressure control valves.

6. In an abrading machine, an abrading element, means for advancing said element into contact with the surface to be abraded, a fluid actuator for applying pressure to said abrading element, pressure control valves operable selectively to establish different pressures within the actuator to produce different pressures between said element and said surface, fluid actuated valves operable selectively to render said pressure control valves effective selectively in a predetermined sequence for predetermined time periods, and adjustable means limiting the travel of one of said fluid actuated valves for adjustably varying the distance of travel of said valve to vary the time period of effectiveness of one of the pressure control valves.

7. In an abrading machine, an abrading element, means for advancing said element into contact with the surface to be abraded, a fluid actuator for applying pressure to said abrading element, a pump, a fluid circuit connecting said pump to the actuator, fluid pressure control valves operable selectively to establish different pressures in the fluid circuit to produce different pressures between said element and said surface, connections between said pressure control valves and said circuit, fluid actuated valves controlling said connections for rendering said pressure control valves effective selectively in a predetermined sequence to control the pressure in the fluid circuit, and a second fluid circuit supplying fluid at a metered rate to said fluid actuated valves for timing the movements of said fluid actuated valves to determine the time periods of effectiveness of said pressure control valves.

8. In an abrading device, an abrading element, means for advancing said element into engagement with the surface to be abraded, a fluid actuator for applying pressure to said abrading element, a pump, a fluid circuit connecting the pump to the actuator, a control valve in said circuit for controlling the connection of said pump to said actuator, a plurality of pressure control valves operable selectively to establish different pressures in said fluid circuit, a fluid actuated valve movable a predetermined distance to render a first one of said pressure control valves ineffective and a second one of said pressure control valves effective to determine the pressure in said fluid circuit, a second fluid actuated valve movable a predetermined distance to render said second pressure control valve ineffective and said first pressure control valve effective to control the pressure in said fluid circuit, means for supplying fluid at a metered rate to said fluid actuated valves to time their movements, and means for preventing movement of said second fluid actuated valve until the first fluid actuated valve has completed its movement.

9. In an abrading machine, an abrading element, means for advancing said element into engagement with the surface to be abraded, a fluid actuator for applying pressure to said abrading element, a pump, a fluid circuit connecting said pump to said actuator, a plurality of pressure control valves operable selectively to establish different pressures in the fluid circuit to produce different pressures between said element and said surface, a fluid actuated valve movable a predetermined distance to render a first one of said pressure control valves ineffective and a second one of said pressure control valves effective to determine the pressure in said fluid circuit, a second fluid actuated valve movable a predetermined distance to render said second pressure control valve ineffective and said first pressure control valve effective to determine the pressure in said fluid circuit and movable an additional predetermined distance to render said first pressure control valve again ineffective and a third pressure control valve effective to determine the pressure in said fluid circuit, means for supplying fluid at a given volumetric rate to time the movements of said fluid actuated valves, and means for preventing movement of said second fluid actuated valve until the first fluid actuated valve has completed its movement.

10. In an abrading machine, an abrading element, means for advancing said element into engagement with a surface to be abraded, a fluid actuator for applying pressure to said abrading element, a pump, a main control valve, a fluid circuit controlled by said valve for connecting said pump to said actuator, a first pressure control valve operable to establish a high pressure in said fluid circuit, a second pressure control valve operable to establish a low pressure in said fluid circuit, a third pressure control valve operable to establish an intermediate pressure in said fluid circuit, a fluid actuated valve for rendering said high pressure control valve ineffective and said intermediate pressure control valve effective for a predetermined period, a second fluid actuated valve operable to render said intermediate pressure control valve ineffective and said high pressure control valve effective for a predetermined period and operable upon additional movement to render said high pressure control valve ineffective and said low pressure control valve effective to control the pressure in said fluid circuit, and means for supplying a metered quantity of fluid under the control of said main control valve to said fluid actuated valves in sequence.

11. In an abrading machine, an expansible abrading element, means for advancing said element into engagement with the surface to be abraded, a fluid actuator for applying pressure to said abrading element to expand said element and to apply pressure between said element and surface, a first pressure control valve for producing a high pressure in the actuator, a second pressure control valve for producing a low pressure in said actuator, a third pressure control valve for producing an intermediate pressure in said actuator, means for rendering said first pressure control valve effective to produce an initial high pressure in said actuator to expand the abrading element, a timing valve operable after a predetermined period to render said first pressure control valve ineffective and said third pressure control valve effective to produce an intermediate pressure between said element and said surface for a predetermined period, a second timing valve operable to render said third pressure control valve ineffective and said first pressure control valve effective to produce a high pressure between said element and said surface for a predetermined period and operable thereafter to render said first pressure control valve ineffective and said second pressure control valve effective to produce a low pressure between said element and said surface, and means for supplying fluid at a given rate to said timing valves in sequence to time the control movements of said timing valves.

ERNEST J. SVENSON.